US012810339B2

(12) United States Patent
Agrawal et al.

(10) Patent No.: US 12,810,339 B2
(45) Date of Patent: Nov. 24, 2026

(54) PERSONALIZED CONTEXT-AWARE DIGITAL CONTENT RECOMMENDATIONS

(71) Applicant: Microsoft Technology Licensing, LLC, Redmond, WA (US)

(72) Inventors: Parag Agrawal, Santa Clara, CA (US); Ankan Saha, New York, NY (US); Aman Gupta, San Jose, CA (US); Viral Gupta, Lathrop, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 176 days.

(21) Appl. No.: 18/788,466

(22) Filed: Jul. 30, 2024

(65) Prior Publication Data

US 2026/0038020 A1 Feb. 5, 2026

(51) Int. Cl.
*G06Q 30/00* (2023.01)
*G06Q 30/0601* (2023.01)

(52) U.S. Cl.
CPC ................................ *G06Q 30/0631* (2013.01)

(58) Field of Classification Search
CPC ................................................ G06Q 30/06–08
See application file for complete search history.

(56) References Cited

U.S. PATENT DOCUMENTS

| | | | | |
|---|---|---|---|---|
| 2024/0232652 | A1* | 7/2024 | Kadioglu | G06N 5/022 |
| 2024/0330279 | A1* | 10/2024 | Truong | G06F 16/2428 |
| 2024/0354641 | A1* | 10/2024 | Miller | G06N 3/045 |
| 2025/0200430 | A1* | 6/2025 | Varma | G06Q 50/20 |
| 2025/0292663 | A1* | 9/2025 | Baker | G07F 19/206 |

OTHER PUBLICATIONS

Chen, Jianfeng, "Research on the Application of Machine Learning-based Artificial Intelligence Algorithms in Recommendation Systems", 2023 Int'l Conf. on Artificial Intelligence and Automation Control 979-8-3503-8380-5/23 (Year: 2023).*

"Hadamard Product (Matrices)," From: https://en.wikipedia.org/wiki/Hadamard_product_(matrices), Retrieved on: Jun. 26, 2025, 7 pages.

* cited by examiner

*Primary Examiner* — Ethan D Civan
(74) *Attorney, Agent, or Firm* — NICHOLSON DE VOS WEBSTER & ELLIOTT, LLP

(57) ABSTRACT

Embodiments of the disclosed technologies are capable of generating, using a machine learning model and a prompt, first content recommendations. The prompt comprises a search query and historic information associated with an entity. The first content recommendations are presented. The embodiments describe receiving a selection of a content recommendation of the first content recommendations. The embodiments describe generating, using the machine learning model and a second prompt, second content recommendations. The second prompt comprises a second search query and second historic information associated with the entity. The embodiments describe generating a ranked order of the second content recommendations using a history of entity interactions including the selection of the content recommendation of the first content recommendations. The embodiments describe determining context-aware recommendations by optimizing a permutation of the ranked order of the second content recommendations. The embodiments describe causing the context-aware recommendations to be presented.

20 Claims, 8 Drawing Sheets

PERSONALIZED CONTEXT-AWARE DIGITAL CONTENT RECOMMENDATIONS

TECHNICAL FIELD

Embodiments of the invention relate to the technical fields of determining personalized context-aware digital content recommendations.

BACKGROUND

A recommendation engine is a software program that helps users find information online. A user provides search query terms using an interface and subsequently inputs a signal that initiates a search. In response to the initiated search, the recommendation engine retrieves information related to the search query. The retrieved information can be presented to the user via the interface.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
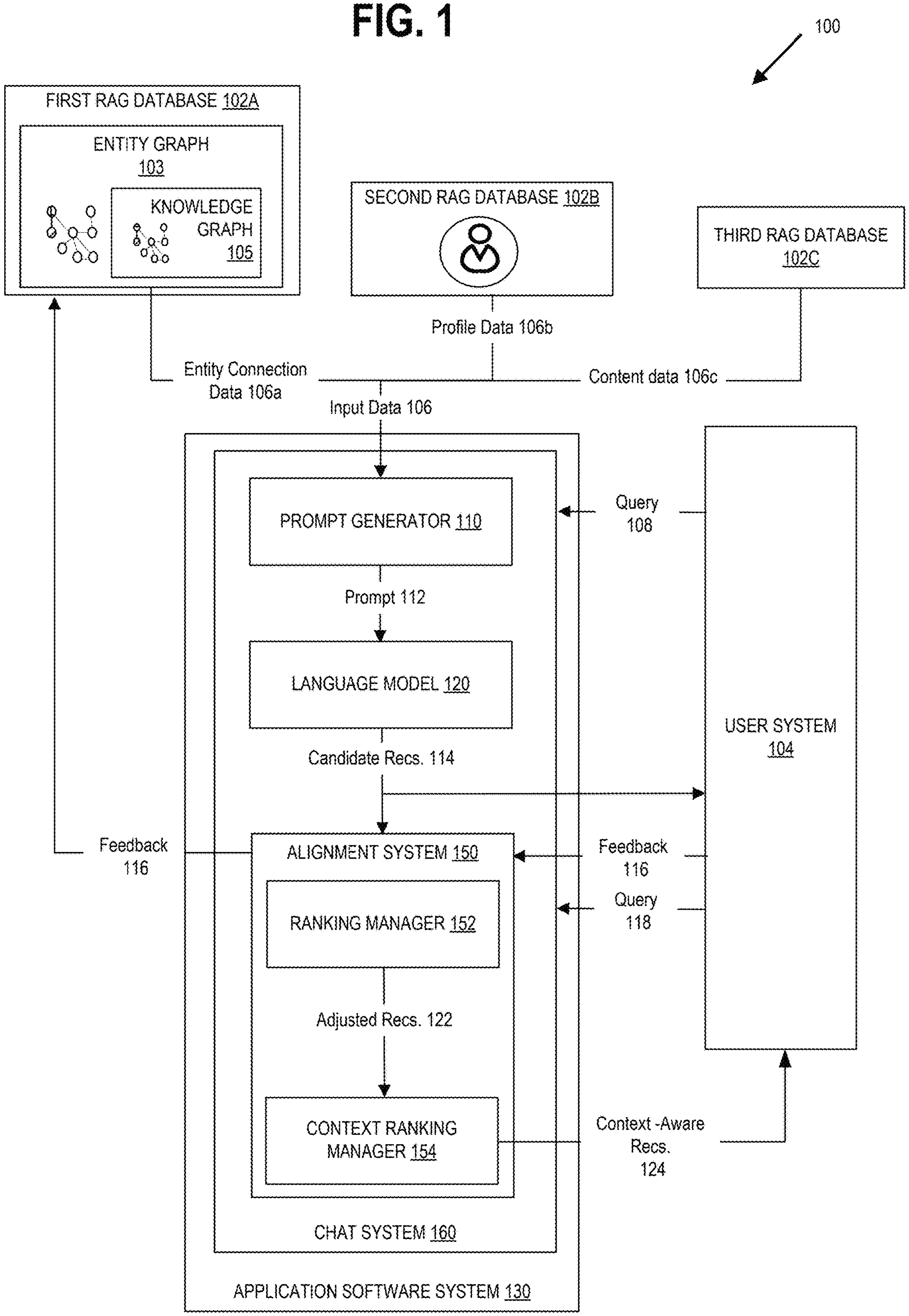
FIG. 1 is a flow diagram of an example method for providing user-personalized and context-aware ranked digital content recommendations to a user using a computing system, in accordance with some embodiments of the present disclosure.

Responsive to receiving a search query, a recommendation engine ranks results of the search query in a rank order according to a ranking score, where the search result with the highest-ranking score is presented as the first item in a list (e.g., at the top of the list) and search results with lower ranking scores are presented further down in the list. The position of a content recommendation (e.g., an item of a search result) in a user interface relative to other items of the search result often corresponds to the ranking score of the item. Examples of search results include digital content items, such as job postings, documents, videos, audio files, digital images, and web pages, such as entity profile pages.

In an embodiment, at least some portions of a content ranking process are performed by a machine learning model. The machine learning model uses a "learning-to-rank" algorithm to learn a function that assigns a score to one or more content recommendations responsive to the search query. The machine learning model can be trained to rank content recommendations by relying on patterns and inferences learned from training data, without requiring explicit instructions pertaining to how the task is to be performed.

Supervised learning is a method of training a machine learning model given input-output pairs. An input-output pair is an input with an associated known output (e.g., an expected output, a labeled output, a ground truth). During a training period, a machine learning model iteratively develops statistical correlations used to perform a task (such as determine one or more content recommendations, determine a ranking score for the content recommendations, and in some instances, rank the content recommendations) by receiving training samples included as a training input (e.g., the input of the input-output pair). The machine learning model then predicts an output (e.g., content recommendations and corresponding ranking scores used to rank the content recommendations) by identifying one or more digital content items with the highest confidence scores or probabilities and compares the predicted output to the known output associated with the training input (e.g., the output of the input-output pair, or the ranked content recommendations). For example, to train a machine learning model to determine a ranking score of a content recommendation, the training input can include a search query and the training output can include one or more content recommendations and a corresponding ranking score. Over time, (e.g., a number of training iterations), an error based on the difference between the predicted output and the known output decreases.

A generative model uses artificial intelligence technology, e.g., neural networks, to machine-generate new digital content based on model inputs and the previously existing data with which the model has been trained. Whereas discriminative models are based on conditional probabilities P (y|x), that is, the probability of an output y given an input x (e.g., is this a photo of a dog?), generative models capture joint probabilities P (x, y), that is, the likelihood of x and y occurring together (e.g., given this photo of a dog and an unknown person, what is the likelihood that the person is the dog's owner, Sam?).

A generative language model is a particular type of generative model that generates content in response to model input. A large language model (LLM) is a type of generative language model that is trained using an abundance of domain-neutral data (e.g., publicly available data) such that billions of hyperparameters that define the LLM are used to learn a task. In operation, LLMs track relationships in sequential data by receiving tokens (e.g., words in a sentence) and predicting a next token (or sequence of tokens). As such, LLMs are able to mimic human language by generating responses that are coherent and contextualized. Generative language models and large language models are referred to herein as generative machine learning models (GMLM).

Applying a GMLM trained with domain-neutral data to a specific domain can cause the performance of the GMLM to decrease. A domain can include a particular technology field, service field, product, and the like. Domain-specific data may include domain-specific vocabulary, domain-specific styles (e.g., the use of acronyms, casual style, conservative style, professional style), and/or domain-specific formatting. The characteristics of domain-specific data distinguish such data from other domains that may not have the same vocabulary, style preferences, and/or formatting preferences. For example, the vocabulary, tone, and style used in a first domain (e.g., a professional networking domain) can be different from the vocabulary, tone, and style used in a second domain (e.g., an entertainment domain). As a result, the accuracy of a GMLM trained with domain-neutral data would not satisfy a threshold accuracy in determining the vocabulary, tone, and/or style of the first domain. That is, a task associated with domain-specific data performed by a GMLM trained using domain-neutral data will likely be performed at a degree of confidence or reliability less than a threshold degree of confidence or reliability.

One mechanism used to improve the accuracy and/or confidence of a GMLM trained using domain-neutral data to perform a domain-specific task is to fine-tune the GMLM with respect to the particular domain. Fine-tuning may refer to a mechanism of adjusting the parameters of the machine learning model that have been previously trained on domain-neutral data by training the pretrained machine learning model using domain-specific data. However, fine-tuning a GMLM can consume significant computing resources associated with retraining the parameters of the GMLM and generating and storing domain-specific training data (e.g., input-output pairs used during supervised learning). For example, the time needed to iteratively adjust the billions of hyperparameters of the GMLM such that the GMLM can perform a domain-specific task at a degree of confidence or reliability that meets or exceeds a threshold degree of confidence or reliability can be significant. Further, computing resources such as power and bandwidth associated with training the GMLM during the period of iterative adjustments to the billions of hyperparameters of the GMLM can be significant.

Aspects of the present disclosure align the response of a domain-neutral GMLM such that the aligned response is domain-specific and user-personalized. An alignment system leverages feed forward neural networks and an optimization algorithm to align the response of the domain-neutral GMLM. Training the feed forward neural networks and the optimization algorithm of the alignment system reduces computing resources that are associated with fine-tuning or retraining a GMLM to be domain-specific. For example, the architecture of a feed forward neural network is smaller than that of a GMLM, reducing the power, bandwidth, and number of training iterations used to train the feed forward neural network to provide an output that satisfies a threshold degree of confidence. That is, feed forward neural networks have fewer learnable parameters than the number of learnable parameters of a GMLM making them easier and more efficient to train than GMLMs.

As described above, GMLMs are well suited to form conversations with users by predicting a next token (or a sequence of tokens) given a conversation. Users can feel frustrated when conversing with an GMLM if the GMLM converses with the user in unnatural or inefficient ways. For example, user experience and user engagement can decrease if users are frustrated with the way their conversation with the GMLM is progressing.

Some conventional systems present the user with a list of digital content recommendations, which can increase user frustration. In these systems, the user has the burden of selecting the most relevant digital content recommendation of the list of digital content recommendations. The most relevant digital content recommendation can be the digital content recommendation that is most relevant to the user search query, most relevant to the user search intent, and/or is most likely to be interacted with by the user.

User engagement and user experience can increase if a GMLM communicates with a user in a natural way. Specifically, in the digital content recommendation context, user experience increases if, rather than being presented with a list of digital content recommendations like some conventional systems, users receive personalized and context-aware content recommendations in a conversation format between the user and the GMLM. Aspects of the present disclosure include user-personalized and context-aware ranked digital content recommendations to the user in the form of a conversation between the user and the GMLM. The conversation itself is used as a medium to provide user-personalized and context-aware ranked digital content recommendations, reducing the user burden by presenting information in a natural (e.g., conversational) way.

Certain aspects of the disclosed technologies are described in the context of GMLMs that output pieces of writing, i.e., natural language text. However, the disclosed technologies are not limited to uses in connection with text output. For example, aspects of the disclosed technologies can be used to generate outputs that include non-text forms of machine-generated output, such as digital imagery, videos, and/or audio.

The disclosure will be understood more fully from the detailed description given below, which references the accompanying drawings. The detailed description of the drawings is for explanation and understanding and should not be taken to limit the disclosure to the specific embodiments described.

In the drawings and the following description, references may be made to components that have the same name but different reference numbers in different figures. The use of different reference numbers in different figures indicates that the components having the same name can represent the same embodiment or different embodiments of the same component. For example, components with the same name but different reference numbers in different figures can have the same or similar functionality such that a description of one of those components with respect to one drawing can apply to other components with the same name in other drawings, in some embodiments.

Also, in the drawings and the following description, components shown and described in connection with some embodiments can be used with or incorporated into other embodiments. For example, a component illustrated in a certain drawing is not limited to use in connection with the embodiment to which the drawing pertains but can be used with or incorporated into other embodiments, including embodiments shown in other drawings.

FIG. 1 is a flow diagram of an example method for providing user-personalized and context-aware ranked digital content recommendations to a user using a computing system, in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of an application software system 430 of FIG. 4 or the alignment system 450 of FIG. 4, including, in some embodiments, components shown in FIG. 4 that may not be specifically shown in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

User system 104 includes at least one computing device, such as a personal computing device, a server, a mobile computing device, or a smart appliance. User system 104 includes at least one software application, enabling the user system 104 to bidirectionally communicate with the application software system 130. Additionally, the user system 104 includes a user interface that allows a user to enter a search query (such as query 108 or query 118), receive content recommendations (such as candidate recommendations 114 and context-aware recommendations 124), and interact with a recommendation (e.g., selecting a recommendation to provide feedback 116).

In some embodiments, every time the user system 104 interacts with one or more applications of the application software system 130 (e.g., such as by entering a query 108 and/or 118, uploading a digital content item, updating user profile information, etc.), the user interaction is stored as part of entity connection data 106*a*, profile data 106*b*, and/or content data 106*c* described herein.

Application software system 130 is any type of application software system that provides or enables at least one form of recommendation (e.g., candidate recommendations 114 and/or context-aware recommendations 124) to be presented to the user system 104. Examples of application software system 130 include but are not limited to connections network software, such as social media platforms, and systems that are or are not based on connections network software, such as general-purpose search engines, job search software, recruiter search software, sales assistance software, content distribution software, learning and education software, or any combination of any of the foregoing.

In the example of FIG. 1, the application software system 130 includes a chat system 160. The chat system 160 is any type of conversation system that receives an input from a user (such as natural language text or audio) and presents context to the user via a user interface. The presented context can include recommendations such as candidate recommendations 114 and/or context-aware recommendations 124. The context can also include questions that prompt the user for additional information, information generated by a GMLM (e.g., language model 120), and the like.

In some embodiments, the exchange between the user of the user system 104 and the chat system 160 is conversational. For example, the user may provide query 108 as part of a turn in a conversation. A turn is an interaction of the conversation, such as block of text communicated by one of the participants in the conversation (e.g., a user and the chat system 160). For instance, one turn of the conversation can include a user entering text such as query 108. A subsequent turn of the conversation includes the chat system's 160 response to the query 108. The chat system 160 generates a response to the query 108 using at least in part, language model 120, as described herein. In some embodiments, language model 120 is included as part of the chat system 160. In some embodiments, language model 120 is hosted by an application, server, or system different from the chat system 160.

In the example of FIG. 1, computing system 100 includes an alignment system 150. The alignment system 150 of FIG. 1 includes a ranking manager 152 and a context ranking manager 154. As described herein, the alignment system 150 aligns the output of the language model 120 (e.g., candidate recommendations 114) such that context-aware recommendations 124 are presented to a user at the user system 104. In some embodiments, the alignment system 150 aligns candidate recommendations 114 responsive to the application software system 130 receiving feedback 116 associated with a first set of candidate recommendations. That is, the alignment system 150 aligns candidate recommendations 114 after receiving a second query (e.g., query 118) and feedback 116 associated with a first query (e.g., query 108).

Both candidate recommendations 114 and context-aware recommendations 124 are an ordered list of digital content recommendations that can include recommendations of user profiles (e.g., users who have created user profiles and have stored associated profile data 106*b*) and/or recommendations of digital content items such as articles, blogs, messages, and videos (e.g., content data 106*c*).

In the example of FIG. 1, the components of the alignment system 150 are implemented using an application server or server cluster, which can include a secure environment (e.g., secure enclave, encryption system, etc.) for the processing of input data 106. As indicated in FIG. 1, components of computing system 100 are distributed across multiple different computing devices, e.g., one or more client devices, application servers, web servers, and/or database servers, connected via a network, in some implementations. In other implementations, at least some of the components of computing system 100 are implemented on a single computing device such as a client device.

Input data 106 is domain-specific information that is stored in a database accessible using retrieval augmented generation (RAG). RAG is used to query knowledge databases to provide the domain-specific information to pretrained GMLM (e.g., language model 120) during the course of a conversation with a user. As shown, entity graph 103 and knowledge graph are stored using a first knowledge database (e.g., first RAG database 102*a*) used to provide entity connection data 106*a*, profile information is stored in a second knowledge database (e.g., second RAG database 102*b*) used to provide profile data 106*b*, and digital content items are stored in a third knowledge database (e.g., third RAG database 102*c*) used to provide content data 106*c*. In some embodiments, a single knowledge database stores the entity graph 103, knowledge graph 105, profile information, and digital content items associated with entity connection data 106*a*, profile data 106*b*, and content data 106*c* respectively. The domain-specific information (e.g., input data 106) passed to the chat system 160 can include entity connection data 106*a*, profile data 106*b*, and content data 106*c*.

In some embodiments, when a user interacts with an application of the application software system 130, the user engages with one or more other users of the application and/or content provided by the application. As a result, the entity graph 103, which represents entities, such as users, organizations (e.g., companies, schools, institutions), and content items (e.g., user profiles, job postings, announcements, articles, comments, and shares), is updated (e.g., nodes or edges of the entity graph can be updated).

In operation, one or more other components (not shown) traverse the entity graph 103 and/or knowledge graph 105 for entity connection data 106*a*. As described herein, entity graph 103 represents relationships, also referred to as mappings or links, between or among entities as edges, or combinations of edges, between the nodes of the graph. In some implementations, mappings between or among different pieces of data are represented by one or more entity graphs (e.g., relationships between different users, between users and content items, or relationships between job postings, skills, and job titles). In some implementations, the edges, mappings, or links of the entity graph 103 indicate online interactions or activities relating to the entities connected by the edges, mappings, or links. For example, if a user views an article, an edge may be created connecting the user with the article in the entity graph, where the edge may be tagged with a label such as "viewed."

Portions of entity graph 103 can be automatically regenerated or updated from time to time based on changes and updates to the stored data, e.g., in response to updates to entity data and/or updates to user data from a user. Also, entity graph 103 can refer to an entire system-wide entity graph or to only a portion of a system-wide graph, such as a sub-graph. For instance, entity graph 103 can refer to a sub-graph of a system-wide graph, where the sub-graph pertains to a particular entity or entity type.

Figure 5:
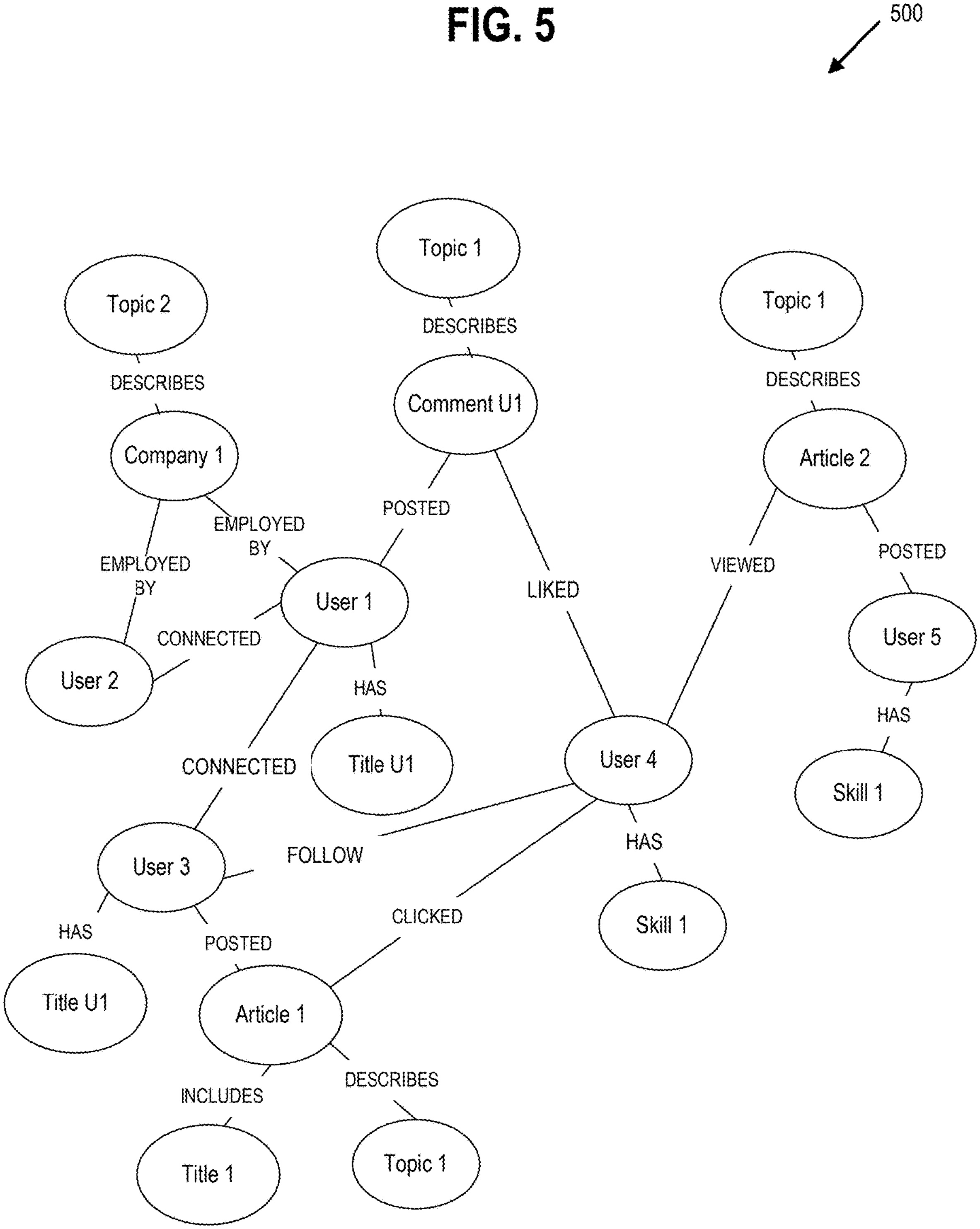
FIG. 5 is an example of an entity graph in accordance with some embodiments of the present disclosure.

Not all implementations have a knowledge graph, but in some implementations, knowledge graph 105 is a subset of entity graph 103 or a superset of entity graph 103 that also contains nodes and edges arranged in a similar manner as entity graph 103 and provides similar functionality as entity graph 103. For example, in some implementations, knowledge graph 105 includes multiple different entity graphs 103 that are joined by cross-application or cross-domain edges or links. For instance, knowledge graph 105 can join entity graphs 103 that have been created across multiple different databases or across multiple different software products. As an example, knowledge graph 105 can include links between content items that are stored and managed by a first application software system and related content items that are stored and managed by a second application software system different from the first application software system. Additional or alternative examples of entity graphs and knowledge graphs are shown in FIG. 5, described below.

Profile data 106*b* can include any information associated with a user. For example, when a user interacts with an application, the user may provide personal information, such as a name, age (e.g., birthdate), gender, interests, contact information, home town, address, spouse's and/or family members' names, educational background (e.g., schools, majors, matriculation and/or graduation dates, etc.), employment history, skills, interests, professional, employment history, area of expertise, organizations, and so on. Some or all of such information can be stored as profile data 106*b*. Profile data 106*b* may also include profile data of various organizations/entities (e.g., companies, schools, etc.), the user's search history and/or the user's previous activity within the same online session or across previous sessions.

Content data 106*c* is any digital content that can be presented (e.g., auditory) or displayed to a user (e.g., job posting, article, comment, user profile, product information). In some embodiments, the digital content items can have an unstructured data. Unstructured data includes files stored without metadata or a predetermined format such as free-form text (e.g., one or more words, phrases, or sentences). In some embodiments, the digital content items can include structured data. Structured data is data in a predetermined format (e.g., JSON format, bullet points).

In some embodiments, content data 106*c* can include any content data associated with a particular digital content item. In an example, content data 106*c* can include a job description, a job location (e.g., the geographic location associated with the job), an indication of previous users who have applied for the job positing (e.g., a set of previous users with one or more shared characteristics such as age, technical background, work experience, etc. that have applied for the job positing), an indication of previous users who have applied for Entity A (e.g., a set of previous users with one or more shared characteristics such as geographic location, work experience, etc. that have applied to work for Entity A), and the like.

In some embodiments, the input data 106 provided to the chat system can be from a variety of different data sources including user interfaces, databases and other types of data stores, including online, real-time, and/or offline data sources. In some embodiments, entity connection data 106*a* is received via one or more database servers; profile data 106*b* is received via one or more web servers; and content data 106*c* is received via one or more user devices or systems, such as portable user devices like smartphones, wearable devices, tablet computers, or laptops; however, any of the different types of input data 106 can be received by the chat system 160 via any type of electronic machine, device or system.

In some embodiments, a user using user system 104 may initiate a conversation with the chat system 160 to request help or advice related to a query 108. In some embodiments, when a user (or more generally, an entity) provides the query 108 to the application software system 130, the query 108 is tagged with user information (e.g., an account number, a user name, or any other identifier) that maps the user that entered the query 108 with user profile data 106*b* and/or entity connection data 106*a*.

In operation, a user associated with profile data 106*b* and/or entity connection data 106*a* can search for one or more digital content items using query 108. An example query 108 can include "who should I add to my network," "who are the leaders in my machine learning network that I should stay in touch with," and/or "what should I read if I want to advance my career as a team leader." Accordingly, the query 108 can be a natural language query (e.g., a free form question, statement, description, etc.). In some embodiments, the query 108 can be entered using one or more filters, check boxes, and/or predetermined forms.

The prompt generator 110 of the chat system 160 receives natural language text including the query 108 and queries one or more RAG databases to receive domain-specific information for the language model 120 such that the language model 120 can generate a response to the query 108. The prompt generator 110 determines which RAG database(s) to query and/or what domain-specific information (e.g., entity connection data 106*a*, profile data 106*b*, and/or content data 106*c*) should be obtained using the query 108 and the corresponding information associated with the user that entered the query. For example, in some embodiments, the query 108 and/or user information is compared to stored entity connection data 106*a*, stored profile data 106*b*, and/or stored content data 106*c* using one or more similarity metrics such as embedding based retrieval.

The prompt generator 110 (or other component of the application software system 130) can encode the query 108 and/or user information to obtain one or more embeddings. For instance, the query 108 can be tokenized (e.g., partitioned into tokens including one or more words or one or more characters of the query 108). One or more tokens are encoded into an embedding using an encoder, for instance. An embedding is a latent space representation of the token that encodes the meaning of the token in an embedding space. Tokens associated with similar meanings are positioned closer together in embedding space.

In some embodiments, the entity connection data 106*a*, the profile data 106*b* and/or the content data 106*c* is stored in the first RAG database 102*a*, the second RAG database 102*b*, and the third RAG database 102*c* respectively as token embeddings.

The one or more token embeddings of the query 108 are compared (e.g., by the prompt generator 110) to the token embeddings of the entity connection data 106*a*, the profile data 106*b* and/or the content data 106*c*. In some embodiments, cosine similarity is applied to quantify the similarity between token embeddings of the query 108 and token embeddings of the entity connection data 106*a*, the profile data 106*b* and/or the content data 106*c*. In operation, the value of the cosine of the angle between the compared embeddings in embedding space indicates a similarity of embeddings. For example, higher, positive values (closer to 1) indicate greater degrees of similarity and lower, negative values (closer to 01) indicate greater degrees of dissimilarity. In some embodiments, the k most similar embedding pairs (e.g., the one or more embeddings of entity connection data 106*a*, the profile data 106*b* and/or the content data 106*c* compared to one or more embeddings of the query 108 and/or user information) are obtained as input data 106 using the prompt generator 110 and included in the prompt 112.

The prompt 112 can be in the form of natural language text, such as a question or a statement, and can include non-text forms of content, such as digital imagery and/or digital audio. In some embodiments, the prompt generator 110 generates one or more portions of the prompt 112 by applying one or more string transformations to the input data 106. For example, obtained profile data 106*b* can be inserted into a prompt by creating an input prompt string. In some embodiments, the prompt 112 includes the query 108 and user information associated with the user that entered the query 108 (e.g., profile data 106*b* and/or entity connection data 106*a*).

The prompt 112 can also include instructions and/or examples of content used to explain the task that the language model 120 is to perform. For example, the prompt 112 can include a task description such as "generate a ranked order of digital content items based on a relevance of the digital content items to a user defined by the input data 106."

The language model 120 is a pretrained GMLM that has been pretrained to perform one or more natural language tasks using-domain neutral data. The language model 120 can be any sequence-to-sequence GMLM. For example, the language model 120 can include an instance of a text-based encoder-decoder model that accepts a string as an input and outputs a string.

The language model 120 is configured to generate a natural language response to the query 108 in a conversational format. The response can include candidate recommendations 114 and can be a next turn in the conversation. As a result, the candidate recommendations 114 are presented to the user of the user system 104.

As described herein, the candidate recommendations 114 represent an ordered list of digital items (e.g., content recommendations). Positions of content recommendations in the ordered list are assigned based on a relevance of the content recommendation given the query 108 and/or the user (e.g., indicated via profile data 106*b* and/or entity connection data 106*a*). In some embodiments, higher positions in the ordered rank represent high-quality content recommendations (e.g., relevant content recommendations), and lower positions in the ordered rank represent low-quality content recommendations (e.g., less relevant or irrelevant content recommendations).

A high-quality content recommendation is a content recommendation that includes one or more topics referred to in a query (e.g., query 108 and/or query 118) and can match a user search intent (e.g., the content recommendation is a personalized). A high-quality content recommendation can match a user search intent if the content recommendation includes one or more topics referred to in the query, user profile information (e.g., if the topic is explicitly described in the user information such as using string matching to identify a topic matches a user's previous work experience) and/or is semantically related to the user information. In some cases, a content recommendation is a high-quality content recommendation given a threshold amount of content in the user information and query that matches (or is semantically similar) to content in the digital content item. For example, a threshold number of semantically similar tokens are identified in the digital content item, the query, and the user information. As a result of the high-quality content recommendation including one or more topics referred to in the query and matching the user search intent, a high-quality content recommendation has an increased likelihood of being interacted with by a user. Accordingly, a high-quality content recommendation has a likelihood of user interaction that meets or exceeds a user engagement threshold. A low-quality content recommendation is a content recommendation that does not refer to a topic in the query, does not include a topic that is relevant to a user based on a user search intent, or some combination. Accordingly, a low-quality content recommendation has a likelihood of user interaction that does not meet or exceed the user engagement threshold.

For example, suppose a query of "Alex" is input by a first user, and the first user search intent is to search for profile information about a person named "Alex V." In this example, a high-quality content recommendation would be a user profile of a person named "Alex V" (because the content recommendation matches the user's intent of searching for a person) and a low-quality content recommendation would be an article about a product called "Alexa" (because the content recommendation associated with a product does not match the user's intent to search for a person). Accordingly, the first user has an increased likelihood of selecting the user profile of the person named "Alex V." As another example, suppose a query of "Alex" is input by a second user, and the second user's search intent is to search for a product called "Alexa." In this example, a high-quality content recommendation would be an article about a product called "Alexa" (because the content recommendation matches the user's intent of searching for a product) and a low-quality content recommendation would be a user profile of a person named "Alex V" (because the content recommendation associated with a person does not match the user's intent to search for a product). Accordingly, the second user has an increased likelihood of selecting the article about the product called "Alexa."

Low-quality content recommendations distract users from their true search intent and decrease the user experience. Additionally, low-quality content recommendations waste computing resources associated with searching for and scoring irrelevant content recommendations or re-obtaining content recommendations and re-ranking the content recommendations based on re-running a query to improve the results of the query (e.g., to obtain high-quality content recommendations). In contrast, high-quality content recommendations improve the search ecosystem by increasing a user experience through increased searcher engagement and downstream activities. Downstream activities are related to user engagement. Examples of such downstream activities include interacting with a content recommendation such as clicking on the content recommendation. In some embodiments, if the content recommendation is a job posting, a downstream activity associated with the content recommendation would be a user applying for the job position identified in the job posting.

Because the candidate recommendations 114 are determined using a GMLM trained on domain-neutral data (e.g., language model 120), the candidate recommendations 114 are noisy in that some content recommendations of the candidate recommendations 114 may be high-quality content recommendations and some content recommendations of the candidate recommendations 114 may be low-quality recommendations. That is, the language model 120 is not trained with the domain-specific vocabulary, tone, formatting, or other characteristics of the domain-specific data present in input data 106, resulting in noisy candidate recommendations 114.

In operation, the language model 120 outputs a probability distribution indicating a likelihood of each content recommendation being a high-quality content recommendation given the query 108 and user information included in the input data 106. Content recommendations that are associated with likelihoods of user interaction (e.g., based on a relevance given the query 108 and user information) that meet or exceed the user engagement threshold are ranked higher in the ordered list of candidate recommendations than content recommendations that are associated with likelihoods of user interaction (e.g., based on a relevance given the query 108 and user information) that do not meet or exceed the user engagement threshold.

Responsive to receiving n candidate recommendations 114 (e.g., via a user interface that presents the n candidate recommendations 114 to a user), the user provides feedback 116. Feedback 116 can include negative feedback or positive feedback. Positive feedback can be defined broadly as any interaction between the user associated with the query 108 and a content recommendation of the candidate recommendations 114. For example, given candidate recommendations 114 that suggests user profiles that the user associated with query 108 may be interested in connecting with, positive feedback can include clicking on a user profile, liking an article written by a user associated with a user profile recommended in the candidate recommendations 114, sharing an article written by a user associated with a user profile recommended in the candidate recommendations 114, sending a message to a user associated with a user profile recommended in the candidate recommendations 114, and the like. Negative feedback is when a user does not interact with a content recommendation from the candidate recommendations 114. Feedback 116 is stored as a label associated with each recommendation of the n candidate recommendations 114. The label I can represent a positive interaction (e.g., the label is assigned a value of "1") or a negative interaction (e.g., the label is assigned a value of "0").

In some embodiments, feedback 116 is used to update the entity graph 103 and/or the knowledge graph 105. For example, if a user of user system 104 makes a connection with a user recommended via candidate recommendations 114 (or context-aware recommendations 124 described herein), then the entity graph 103 and/or knowledge graph 105 is updated to indicate the connection between the two users. For instance, a new edge is built between two users in entity graph 103 and/or knowledge graph 105 using any one or more edge building techniques.

Subsequently, the user enters query 118. Query 118 is a query entered subsequent to query 108. Examples of query 118 can include "who should I add to my network next," "who is another leader in my machine learning network that I should stay in touch with," and/or "what should I read next if I want to advance my career as a team leader." Accordingly, query 118 is a continuation of query 108. In some embodiments, query 118 is not a continuation of query 108. For example, query 118 can change the topic of the conversation between the user and the chat system 160. Accordingly, query 118 is any query of a conversation received by the chat system 160 at a time after (e.g., subsequent) the query 108.

Query 108 and query 118 are examples of a series of queries within a conversation between a user of the user system 104 and the chat system 160. While two queries are illustrated, it should be appreciated that additional queries can be communicated by the user throughout the duration of a conversation between the user of the user system 104 and the chat system 160.

In response to query 118 (or any query after the initial query 108), candidate recommendations 114 generated by the language model are provided to the alignment system 150 instead of being provided to the user system 104. As described herein, the alignment system 150 is used to align an ordered list of content recommendations determined by a pretrained language model (e.g., language model 120). The alignment system 150 shifts the burden of user personalization from the language model 120 to the alignment system 150. That is, instead of obtaining multiple user-specific language models (e.g., a user-specific language model for each person and/or a user-specific language model for each group of people (people of the same gender, people of the same career, people with similar interests, people in similar geographic locations))), the alignment system 150 personalizes candidate recommendations 114 using the ranking manager 152. In operation, the ranking manager 152 re-ranks the candidate recommendations 114 according to a specific user need based on historic interactions of that user.

The adjustments to the order of the candidate recommendations 144 result in adjusted recommendations 122 and are based on a real-time loss. The real-time loss represents an adjustment to the candidate recommendations 114 to align the candidate recommendations 114 with a more accurate ordered ranking based on a history of user interactions.

In a conversation between a user using user system 104 and chat system 160, the flow of the conversation can move quickly between different topics. For example, a first topic of the conversation can be about finding a person to help review or revise a resume, a second topic of the conversation can be about finding a job recommendation in a particular field, and a third topic of the conversation can be about interview tips for a job in that particular field. Accordingly, the needs of the user in the conversation change dynamically across the course of the conversation based on the different topics of the conversation. For example, the needs of the user associated with the first topic include content recommendations associated with user profiles that can help the user revise their resume, whereas the needs of the user associated with the third topic include content recommendations associated with articles that can help the user prepare for an interview. The history of user interactions captures the dynamic needs of the user by storing the user's interactions with content recommendations given the course of a conversation and/or across multiple conversations within a predetermined time period (e.g., user interactions in the last 2 hours). The history of user interactions can include positive and negative user interactions such as feedback 116 captured within the predetermined time period.

For example, given the first topic of the conversation about finding a person to help review or revise a resume, the language model 120 can generate a first set of candidate recommendations 114

$$(\text{e.g., } y_1^1 \ldots y_n^1),$$

given the second topic of the conversation about finding a job recommendation in the particular field, the language model 120 can generate a second set of candidate recommendations 114

$$(\text{e.g., } y_1^2 \ldots y_n^2),$$

and given the third topic of the conversation about interview tips for the job in the particular field, the language model 120 can generate a third set of candidate recommendations 114

$$(\text{e.g., } y_1^3 \ldots y_n^3),$$

The history of user interactions H would include the candidate recommendation that the user interacted with given each topic of the conversation. For example, $$h_1 = y_1^1,\ h_2 = y_4^2, \text{ and } h_3 = y_2^3$$

representing the user interacting with the first content recommendation from the first set of candidate recommendations, the fourth content recommendation given the second set of candidate recommendations, and the second content recommendation given the third set of candidate recommendations.

The dynamic nature of H enables the adjusted recommendations 122 to account for the user's dynamic needs of the conversation. That is, the dynamic nature of H allows the adjusted recommendations to be recommendations that are synchronized with the user's needs in real-time, where the real-time needs of the user correspond to the user's needs during the course of the conversation with the chat system 160 for instance. As a result, the history of user interactions H is refreshed at a predetermined time interval (e.g., every 120 minutes). That is, any interactions associated with candidate recommendations received within the predetermined time period is captured in the history H, whereas interactions associated with candidate recommendations received after the predetermined time period are not captured.

Only interactions associated with the candidate recommendations 114 are tracked in the history H to prevent context mismatch. For example, a user may enter a query 108 related to machine learning videos and receive n candidate recommendations 114 of machine learning videos. If, during the predetermined time period in which interactions are captured to generate the history H, a user interacts with a different digital content item such as an article related to resume writing, such an article and/or interaction is not stored in the history of user interactions H because the article related to resume writing is not a candidate recommendation 114. If such an interaction were stored in history H, the context for the context-aware recommendations 124 may be skewed, resulting in a set of recommendations that are not context-aware or personalized.

In operation, the ranking manager 252 determines a conditional probability of a content recommendation from the candidate recommendations 214 being interacted with by a user given historic interactions of the user (e.g., H) and candidate recommendations 214. The adjusted recommendations 122 are ranked according to the conditional probabilities of the content recommendations, where higher conditional probabilities of content recommendations are ranked at higher positions in the order of adjusted recommendations 122 than lower conditional probabilities of content recommendations.

The context ranking manager 154 receives the adjusted recommendations 122 from the ranking manager 152 and further adjusts or modifies the ordered list of recommendations. The context ranking manager 154 adjusts the permutations of the adjusted recommendations using a full-rank context loss, as described herein. In a conversational setting, where a limited number of recommendations are provided to a user, the order of recommendations presented to the user is just as important to user experience and user engagement as the recommendations themselves. If the order of recommendations presented to the user is not useful, the user may exit the conversation or otherwise stop interacting with the chat system, reducing the user experience and user engagement.

The context-aware recommendations 124 are an ordered list of the adjusted recommendations 122 based on one or more attributes of each recommendation of the candidate recommendations 114. Accordingly, the order of the context-aware recommendations 124 is more diverse than the order of the adjusted recommendations 122 or the candidate recommendations 114. For example, if the recommendations in the candidate recommendations 114 are recommendations of user profiles (based on a query asking the chat system 160 for recommendations of user profiles to message), attributes of the user profiles can include the geographic location of the users associated with the user profiles, employers of the users associated with the user profiles, an age of the user associated with the user profiles, and the like.

In a non-limiting example, an ordered list of candidate recommendations 114 may include clusters of content recommendations based on the relevance of the query 108 to the user information. For instance, if the user is employed at Entity A (as indicated by profile data **106*b*), then a query 108 asking "who are senior members that I should message" may result in candidate recommendations 114 emphasizing senior members of Entity A. For example, the first four recommendations in the candidate recommendations 114 are senior members of Entity A (e.g., a first cluster of recommendations), the next two recommendations in the candidate recommendations 114** are senior members of Entity B (e.g., a second cluster of recommendations), and the last two recommendations in the candidate recommendations are senior members of Entity C (e.g., a third cluster of recommendations).

The real-time loss used by the ranking manager 152 to generate the adjusted recommendations 122 can result in intra-cluster adjustments of the ranking of candidate recommendations 114. That is, adjustments can be made to recommendations associated with a particular attribute. For example, the order of content recommendations associated with the particular attribute are adjusted. In the above example, the order of the first four recommendations (e.g., the first cluster of recommendations associated with attribute Entity A) may be adjusted (e.g., switching the order of the second recommendation with the first recommendation, for instance).

The context ranking manager 154 further adjusts or modifies the adjusted recommendations 122 by performing inter-cluster adjustments. That is, adjustments can be made to recommendations across multiple attributes. For example, the order of content recommendations associated with multiple attributes are adjusted. In the above example, the first recommendation of the third cluster (e.g., a recommendation for a senior member associated with attribute Entity C) may be rearranged such that it replaces the second recommendation of the first cluster (e.g., a recommendation for a senior member associated with attribute Entity A).

The context-aware recommendations 124 are personalized with respect to the user who entered the query (e.g., query 108 and query 118), contextualized given the interactions between the user and the application software system 130 (e.g., the history of user interactions), and contextualized given the candidate recommendations. That is, the context-aware recommendations 124 are content recommendations that are ordered in a diverse manner based on attributes of the content recommendations themselves, and provided to a user.

The context-aware recommendations 124 are passed to the user system 104 for display to the user and/or subsequent processing. Feedback associated with the context-aware recommendations 124 can be captured to build edges in the entity graph 103 and/or knowledge graph 105, to add interactions to the history of user interactions such that a subsequent query results in subsequent context-aware recommendations, and to generate training data.

The examples shown in FIG. 1 and the accompanying description above are provided for illustration purposes. This disclosure is not limited to the described examples. Additional or alternative details and implementations are described herein.

Figure 2:
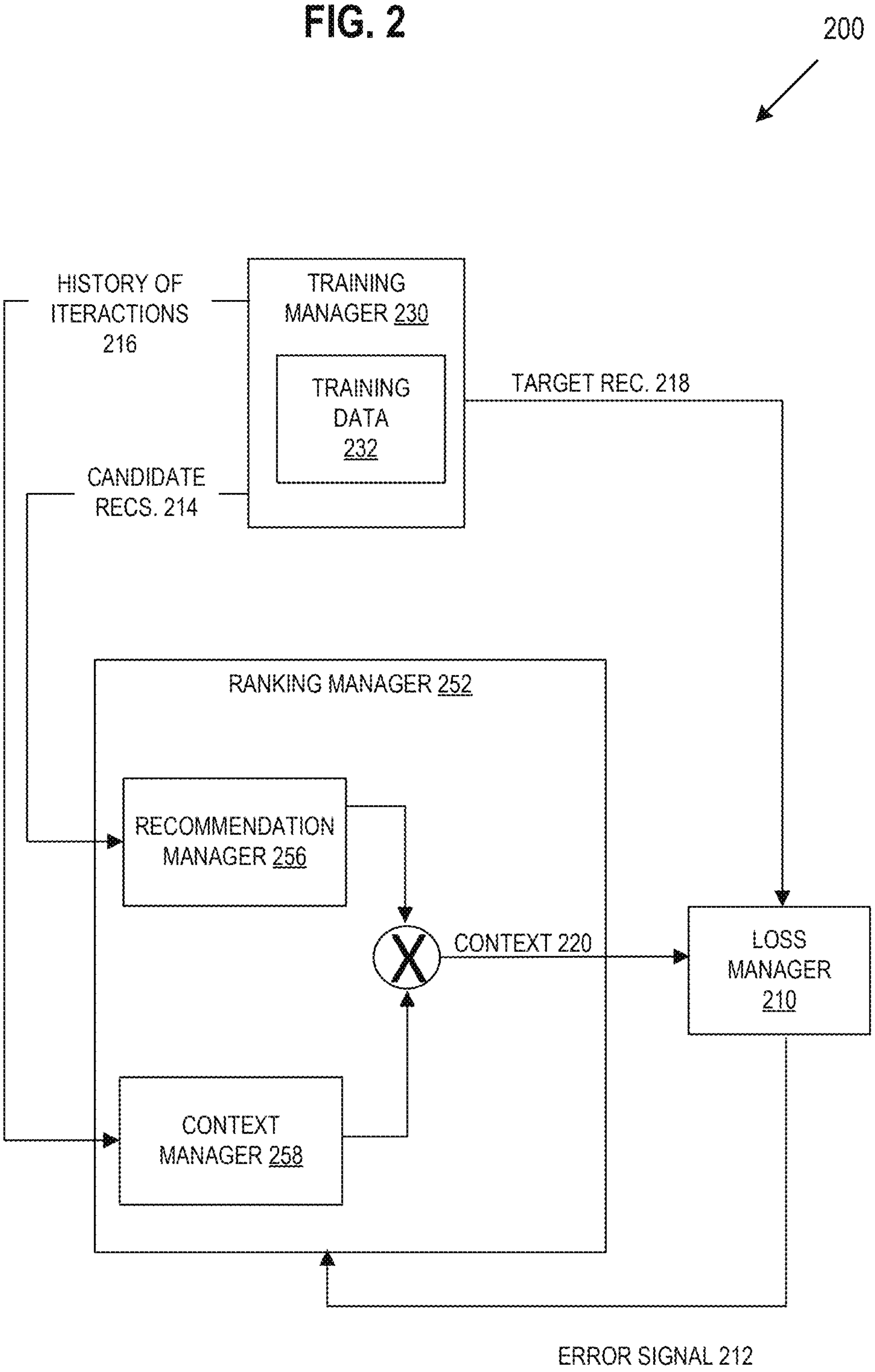
FIG. 2 is a flow diagram of an example method for training the ranking manager to generate adjusted recommendations using supervised learning, in accordance with some embodiments of the present disclosure.

FIG. 2 is a flow diagram of an example method for training the ranking manager to generate adjusted recommendations using supervised learning, in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of an application software system 430 of FIG. 4 or the alignment system 450 of FIG. 4, including, in some embodiments, components shown in FIG. 4 that may not be specifically shown in FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

As described herein, supervised learning is a method of training a machine learning model given training data 232 including input-output pairs. An input of the input-output pair used by the training manager 230 to train the ranking manager 252 includes a tensor with each row including [v, x, $H_v$, $<y_1, l_1><y_2, l_2> \ldots <y_n, l_n>$]. As described with reference to FIG. 1, v represents the user associated with user profile 106*b* and/or entity connection data 106*a* that entered a query, x represents the query 108 entered by user v, $y_1 \ldots y_n$ represent n candidate recommendations 114 determined by the language model 120, I represents the positive or negative feedback associated with each content recommendation of the candidate recommendations 114, and $H_v$ represents a vector or matrix collection of user v interactions within a predetermined time period.

An output of the input-output pair used by the training manager 230 to train the ranking manager 252 includes a target recommendation 218. The target recommendation 218 is a content recommendation of the set of candidate recommendations that was interacted with by a user given a particular query. Accordingly, the target recommendation 218 can be one entry of the history of interactions 216. Similarly, the target recommendation 218 can be one entry of the candidate recommendations 214.

As described herein, the ranking manager 252 (e.g., ranking manager 152 described in FIG. 1) is used to generate an adjusted ranked list of candidate recommendations (e.g., adjusted recommendations 222). As shown in example 200, the ranking manager 252 includes recommendation manager 256 and context manager 258 used to create embedding representations of their respective inputs.

The input to the recommendation manager 256 is n candidate recommendations 214 including $y_1 \ldots y_n$ (e.g., candidate recommendations 114 determined by the language model 120 described in FIG. 1) of the training data 232. In some embodiments, in addition to the candidate recommendations 214 of the training data 232, the recommendation manager 256 receives additional information associated with each candidate recommendation $y_i$. Additional information associated with each candidate recommendation can be entity connection data 106*a*, profile data 106*b*, and/or content data 106*c* described in FIG. 1. For example, in addition to receiving user profile 1 as candidate recommendation 1 (e.g., $y_1$), the recommendation manager 256 can receive additional information such as the geolocation of the user associated with the user profile 1 and the industry associated with the user profile 1 (e.g., data obtained from profile data 106*b* described in FIG. 1).

The input to the context manager 258 is the history of interactions 216 of the training data 232. The history of interactions 216 received by the context manager 258 of the ranking manager 252 is the set of user interactions Hy associated with content recommendations captured within a predetermined time period (e.g., 2 hours). Capturing Hy within a predetermined time period enables the history of interactions 216 to represent the near real time historical context for a given user v. As described herein the needs of the user (represented by the user interactions) change across the course of a single conversation (e.g., different topics in a single conversation) over time. Accordingly, the history of interactions 216 for a user v during a predetermined time period can be represented as Hy. In some embodiments, in addition to the history of interactions 216, the context manager 258 receives additional information associated with the history of interactions 216. Additional information associated with history of interactions 216 can include, for example, a timestamp of the when a positive interaction was captured by the application software system 130 and a geolocation of the user providing the positive interaction. The geolocation of the user providing the positive interaction can be determined using the IP address of the user system 104 associated with the user, for instance.

Both the recommendation manager 256 and the context manager 258 are neural network models that generate embedding representations of their respective inputs. An embedding is a latent space representation of an input as a real-valued vector. The latent space representation is a compressed representation of the input. The recommendation manager 256 generates an embedding $e_o$ representing an embedding of the ordered list of candidate recommendations 214 and in some embodiments additional information associated with the candidate recommendations. The context manager 258 generates an embedding $e_v$ representing an embedding of history of interactions $H_v$ for a user v. In some embodiment, additional information associated with the history of interactions $H_v$ is used by the context manager 258 to generate the embedding $e_v$.

A neural network includes a number of layers that are interconnected using weights. Each layer includes a number of neurons that perform a particular computation and are interconnected to neurons of adjacent layers. Neurons in each of the layers sum up values from adjacent neurons and apply an activation function, allowing the layers to detect nonlinear patterns. Neurons are interconnected by weights, which are adjusted based on error signal 212 determined by the loss manager 210 described herein. The adjustment of the weights during training facilitates the neural network's ability to generate an embedding of the input with a threshold degree of confidence or reliability.

In some embodiments, both the recommendation manager 256 and context manager 258 are feed forward neural networks. A feed forward neural network is a type of neural network with fully connected layers. The layers of a fully connected network extract and/or identify features or characteristics of the input that are encoded into an output embedding. The extracted and compressed features of the input result in embedding $e_o$ generated by the recommendation manager 256 and embedding $e_v$ generated by the context manager 258.

The ranking manager 252 algorithmically combines embedding $e_v$ representing an embedding of the set of candidate recommendations associated with user interactions (e.g., history of interactions 216) and embedding $e_o$ representing an embedding of the ordered list of candidate recommendations 214 (e.g., $y_1 \ldots y_n$). For example, the ranking manager 252 performs element wise multiplication (the Hadamard product) of embedding $e_v$ and embedding $e_o$. The combination of the two embeddings produces context 220 (e.g., $c_t$).

The loss manager 210 compares the context 220 to an embedding of the target recommendation $e_y$. In some embodiments, the loss manager 210 includes a neural network configured to generate an embedding of the target recommendation $e_y$. In some embodiments, the training manager 230 includes a neural network configured to generate an embedding of the target recommendation $e_y$.

The loss between the target recommendation 218 and the candidate recommendations 214 accounts for the difference between the recommendations determined by a domain-neutral language model (e.g., language model 120 described in FIG. 1) and domain-specific real-time needs of a particular user. This real-time loss, which is based on the selection of the content recommendation (e.g., the target recommendation 218) and the candidate recommendations 214, is minimized by making one or more adjustments to the candidate recommendations 214.

For example, given an ordered list of candidate recommendations $y_1$, $y_2$, $y_3$ and a target recommendation of $y_2$, the loss determined by the loss manager 210 would indicate that the ranking manager 252 should likely rearrange the order of the candidate recommendations 214 determined by the language model 120. Specifically, given the above example, the likelihood of the user interacting with the second content recommendation (e.g., $y_2$) should be increased.

As described with reference to FIG. 1, the ranking manager 252 obtains a probability distribution from the language model 120 that indicates the likelihood (e.g., a probability score) of each content recommendation being a high-quality content recommendation (e.g., a content recommendation that is relevant to the user and/or that the user is likely to interact with) given the query 108 and the input data 106. Content recommendations that are associated with likelihoods of user interaction (e.g., based on a relevance given the query 108 and user information) that meet or exceed the user engagement threshold are ranked higher in the ordered list of candidate recommendations than content recommendations that are associated with likelihoods of user interaction (e.g., based on a relevance given the query 108 and user information) that do not meet or exceed the user engagement threshold.

As a result of the context 220 generated by the ranking manager 252, the probability distribution associated with the candidate recommendations 214 is rescored. In other words, given the above example where the target recommendation $y_t = y_2$, the ranking manager 252 adjusts the likelihood (e.g., the probability score) of the second most relevant content recommendation in the probability distribution of content recommendations determined by the language model. For example, the candidate recommendations determined by the language model indicate recommendation A associated with a 0.75 probability score (e.g., the content recommendation is likely 75% relevant to the user and therefore a high-quality content recommendation) and recommendation B associated with a 0.74 probability score. Accordingly, the candidate recommendations rank recommendation A at a first position and recommendation B at a second position. The ranking manager 252 rescores the probability score associated with the second highest content recommendation based on the context 220 determined during training. Accordingly, recommendation A may be associated with the 0.75 probability score and recommendation B may be associated with a 0.76 probability score. Accordingly, the adjusted recommendations rank recommendation B at the first position and recommendation A at the second position.

During training, the ranking manager 252 iteratively develops statistical correlations used to re-score the probability distribution of content recommendations $y_1 \ldots y_n$. Mathematically, the conditional probability of the target recommendation $y_t$ given the context $c_t$ or $p(y=y_t|c_t)$ is represented below in Equation (1):

$$p(y = y_t \mid c_t) = \left.\frac{e^{c_t e_t}}{e^{c_t e_t} + \sum_{neg} e^{c_t e_{neg}}}\right) \quad (1)$$

In Equation (1) above, $e_{neg}$ is an embedding of the negative class, where the negative class includes digital content items that were not included in the candidate recommendations 214 and/or content recommendations that were not interacted with by the user. For example, the negative class can include a random selection of digital content items including user profiles, articles, comments, videos, and the like that were not included in the candidate recommendations 214. Additionally or alternatively, if the candidate recommendations 214 that was interacted with by a user was $y_2$, then an example of a content recommendation that may be included in the negative class can include $y_5$. In operation, such digital content items are converted into embedding $e_{neg}$ using a neural network.

The loss manager 210 can determine the loss between the probability of the target recommendation given context 220 and the target recommendation 218 using a loss function such as the binary cross-entropy. The binary cross-entropy loss quantifies the similarity or dissimilarity between probability distributions. The binary-cross entropy loss is mathematically represented in Equation (2) below:

$$L = \sum_{v}\sum_{t} -\log\left(\frac{e^{c_t e_t}}{e^{c_t e_t} + \sum_{neg} e^{c_t e_{neg}}}\right) \quad (2)$$

The weights of the recommendation manager 256 and the context manager 258 are adjusted based on the error signal 212 determined using any similarity metric (such as the binary cross-entropy loss indicated in Equation (2) above). The recommendation manager 256 and context manager 258 can be trained using the backpropagation algorithm, for instance. The backpropagation algorithm operates by propagating the error signal 212 through each of the algorithmic weights of the recommendation manager 256 and/or context manager 258 such that the algorithmic weights adapt based on the amount of error. The error signal 212 may be calculated at each iteration (e.g., each input-output pair), batch, and/or epoch. The value of the weights in each of the neural networks (e.g., recommendation manager 256 and/or context manager 258) is stored such that the ranking manager 252 can be deployed during inference time.

In some embodiments, the training manager 230 retrains the ranking manager 252 at a predetermined frequency. Retraining the ranking manager 252 frequently enables the adjusted recommendations determined by the ranking manager 252 to be near real time. As described herein, the dynamic nature of a conversation causes H to capture dynamic user interactions. Accordingly, retraining the ranking manager 252 with the dynamic H causes the adjusted recommendations generated by the ranking manager 252 to be near real time and high-quality with respect to the user. In other words, frequent retraining of the ranking manager 252 encourages the alignment to be "real time" with respect to the dynamic and diverse user queries. Additionally, retraining the ranking manager 252 frequently is used to maintain an accurate alignment predicted by the ranking manager 252 of the alignment system. The alignment is accurate when the loss (as determined by the loss manager 210) between the context 220 described herein and a target recommendation 218 meets or exceeds a threshold accuracy.

In some embodiments, the training manager 230 retrains the ranking manager 252 every six hours. In some embodiments, the training data 232 is updated using a first-in-first-out method. For example, as the application software system 150 described in FIG. 1) tracks prompts (e.g., x) of users (e.g., v), candidate recommendations (e.g., $y_1 \ldots y_n$) and feedback (e.g., l, H), the rows of the training data 232 tensor are updated such that date that was stored last as training data (e.g., older training data) is rewritten or deleted as new training data is added to the training data 232.

The inclusion of the candidate recommendations 214 (e.g., $y_1 \ldots y_n$) in the tensor input of the input-output pair during supervised training differs from conventional systems that only use historical data as training data (e.g., history of interactions 216 or $H_v$). The additional information provided to the ranking manager 252 using the candidate recommendations 214 better facilitates the ranking manager 252 iteratively developing statistical correlations used to align the candidate recommendations 214 with the target recommendation 218.

In some embodiments (not shown), the ranking manager 252 includes a classifier that that transforms an input of real numbers (e.g., the context 220) into a probability distribution over a number of n classes, where the n classes are based on the n candidate recommendations 214 (e.g., $y_1 \ldots y_n$). In some embodiments, the classifier is the softmax function. The output of the classifier is the probability distribution representing the probability of each of the candidate recommendations given the context 220. In some embodiments, the probability distribution is used to determine adjusted recommendations (e.g., adjusted recommendations 122 described in FIG. 1), where content recommendations with a high probability are ranked at higher positions in the ordered list of adjusted recommendations than content recommendations with a low probability. Accordingly, the ranking manager 252 generates adjusted recommendations, where the ordered set of recommendations are based on the history of a particular user's interaction (e.g., $H_v$).

Figure 3:
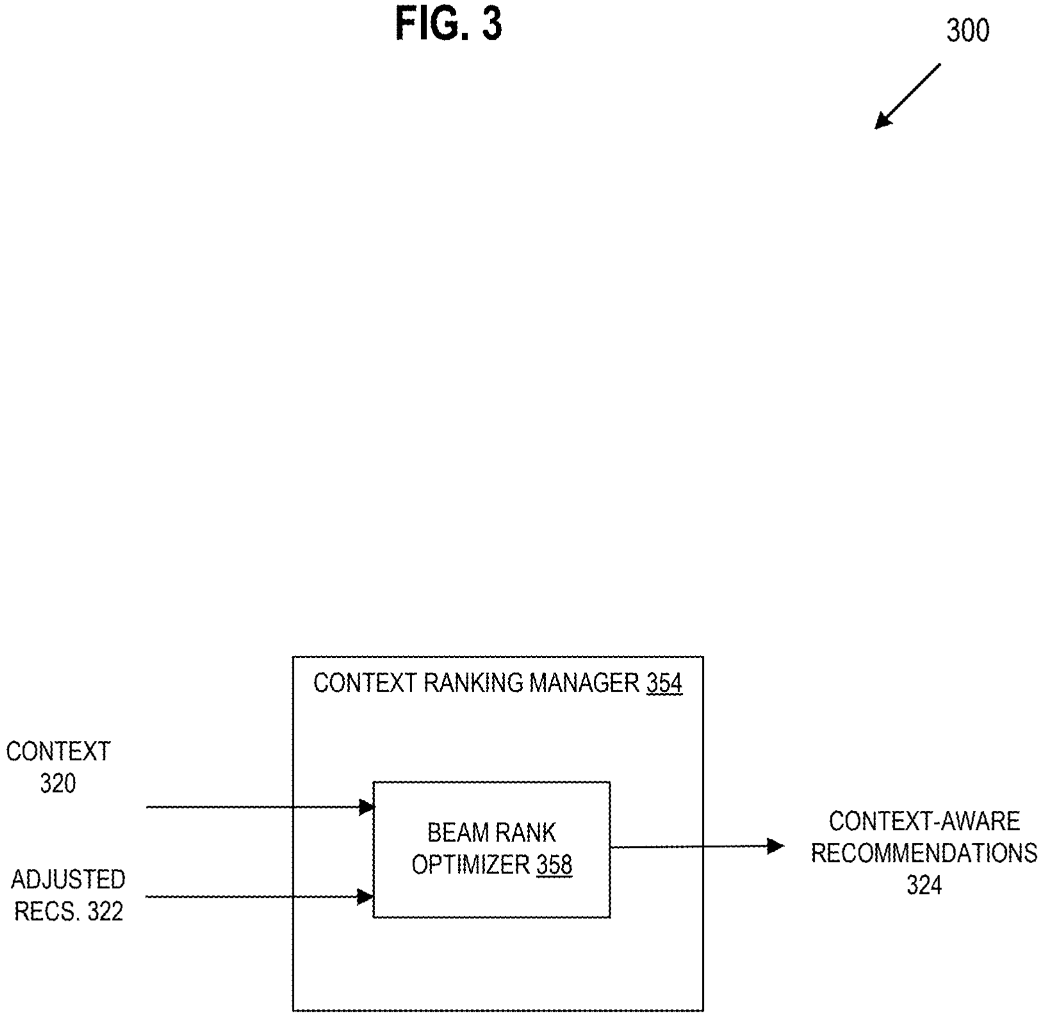
FIG. 3 is an example block diagram of a context ranking manager of the alignment system, in accordance with some embodiments of the present disclosure.

FIG. 3 is an example block diagram of a context ranking manager of the alignment system, in accordance with some embodiments of the present disclosure.

As described herein, the context ranking manager 354 (e.g., context ranking manager 154 described in FIG. 1) is a component of the alignment system (e.g., alignment system 150 described in FIG. 1) used to generate context-aware recommendations 324 by optimizing a permutation of the adjusted recommendations 122 described in FIG. 1.

As illustrated in example 300, the input to the context ranking manager 354 is context 320 (e.g., context 220 described in FIG. 2) and adjusted recommendations 322 (e.g., adjusted recommendations 122 described in FIG. 1).

The total number of permutations that can be determined by the context ranking manager 354 for n content recommendations in the adjusted recommendations 322 is n factorial. Optimizing the permutation for n! recommendations would prevent the alignment system 150 from generating context-aware recommendations 324 in real time. That is, the latency introduced by performing computations associated with optimizing n! recommendation permutations would prevent the alignment system 150 from providing context-aware recommendations 124 to the user in a conversational format (e.g., via the chat system 160 described in FIG. 1).

Unlike conventional systems that evaluate the reward function for each of n! ranked lists, the beam rank optimizer 358 evaluates the reward function a number of times equal to $kn^2$ by maintaining k ranked lists of size n. The beam rank optimizer 358 maintains k ranked list simultaneously, where the k maintained ranked lists are referred to as beams with a beam size of k. In an example, given k=3 (the beam rank optimizer 358 maintains 3 ranked lists), the beam rank optimizer 358 determines the recommendation at the first position of the context-aware recommendations 324 by determining 3 recommendations at the first position, the beam rank optimizer 358 determines the recommendation at the second position of the context-aware recommendations 324 by determining 3 recommendations at the second position, and so on.

In operation, for each content recommendation of the adjusted recommendations 322, the beam rank optimizer 358 determines the probability that the user interact with the target recommendation $y_t$ given the context $c_t$ (e.g., $p(y=y_t|c_t)$), at a position of the ranked list. For each of the k lists maintained by the beam rank optimizer 358, the beam rank optimizer 358 determines the reward of that list using a reward function. The permutation of the context-aware recommendation 324 is selected by the context ranking manager 354 as the list with the highest reward. The reward function used by the beam rank optimizer 358 to determine the permutation of the context-aware recommendation 324 is shown in Equation (3) below:

$$FR(P) = \sum_{t=1}^{n} \frac{p(y = y_t \mid c_t)}{\log(1+t)} \tag{3}$$

The denominator of Equation (3) above acts as a discount factor, which increases the discount (or decreases the effect) of content recommendations in sequential positions of the adjusted recommendation 122. For example, the discount factor discounts the first recommendation in the adjusted recommendation 122 less than the discount applied to the second recommendation in the adjusted recommendation, the discount factor discounts the second recommendation in the adjusted recommendation 122 less than the discount applied to the third recommendation in the adjusted recommendation, and so on.

The reward function used by the beam rank optimizer 358 to determine the permutation includes the entire ranked list of recommendations. As described herein, $c_t$ (e.g., context 320) is based on the candidate recommendations 114 described in FIG. 1. Because the entire ranked list of recommendations is optimized with respect to the position of the content recommendation in the ranked list (e.g., resulting in context-aware recommendations 324), the reward function captures the mutual influence among the content recommendations. As a result, the order of the context-aware recommendations 324 is more diverse than the order of the adjusted recommendations 122 or the candidate recommendations 114 described in FIG. 1. For example, if a senior lead from Entity A is placed at position 1 in the ranked list, to maximize the reward at position 2 in the ranked list, the beam rank optimizer 358 may place a senior leader from Entity B. Accordingly, the attributes of the content recommendations in the candidate recommendations affect the position of the content recommendation in the permutation (e.g., context aware recommendation 324).

In operation, the context ranking manager 354 selects a permutation to be used as the context-aware recommendations 324 based on a ranked list of the k ranked lists that maximizes the reward in Equation (3) above such that each position in the context-aware recommendations 124 represents a maximum likelihood of the user interacting with the recommendation at the position based on the context 320 (e.g., the previous recommendations interacted with by the user and the current candidate recommendations).

Because both the ranking manager 252 described in FIG. 2 and the context ranking manager 354 use the probability that the user interact with the target recommendation $y_t$ given the context $c_t$ (e.g., $p(y=y_t|c_t)$), in some embodiments, both the ranking manager 252 described in FIG. 2 and the context ranking manager 354 are jointly trained by the training manager 230 described in FIG. 2. That is, the ranking manager 252 and the context ranking manager 354 are trained jointly (e.g., end-to-end training) using the loss determined by the loss manager 210 described in FIG. 2.

Figure 4:
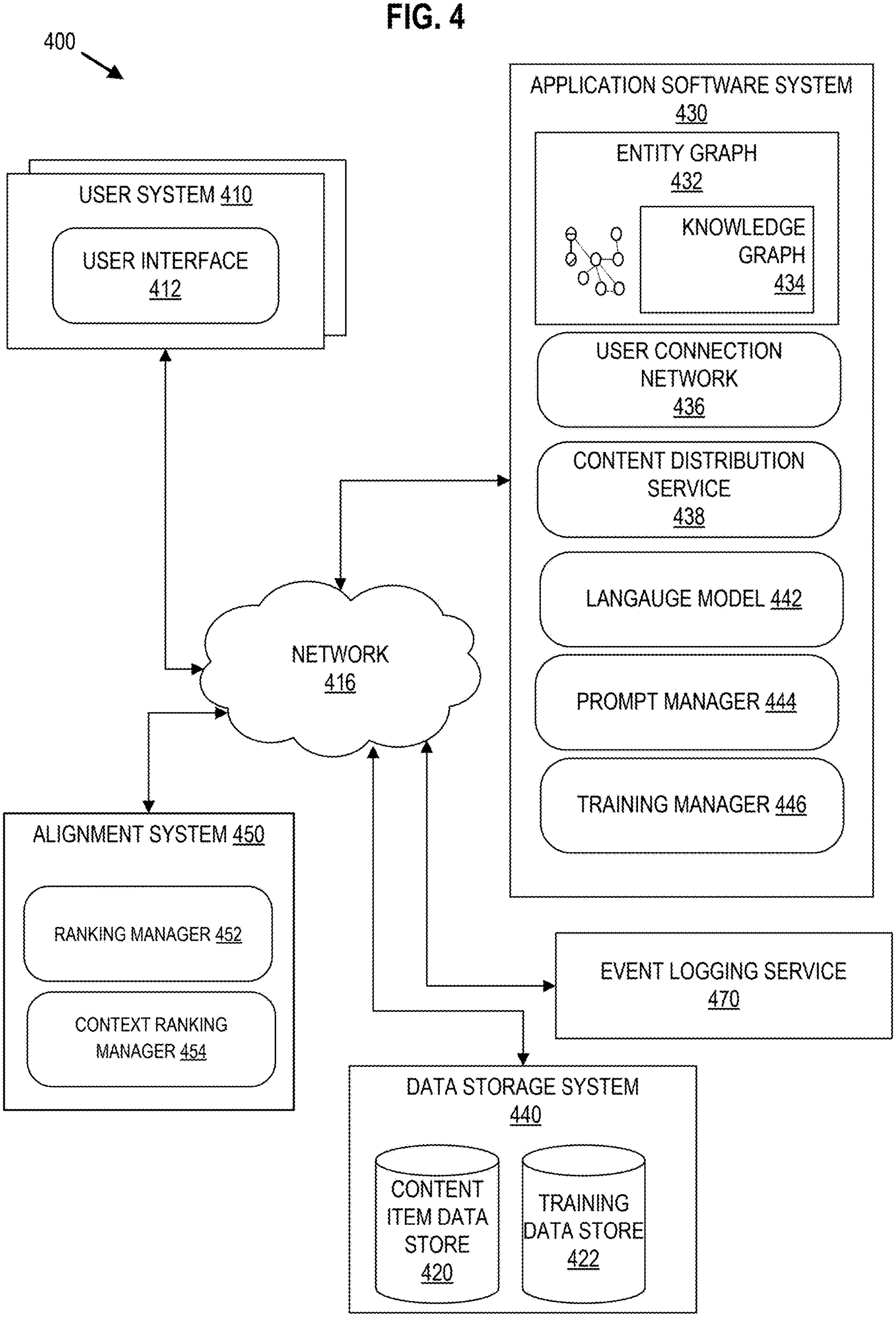
FIG. 4 is a block diagram of a computing system that includes an alignment system, in accordance with some embodiments of the present disclosure.

FIG. 4 is a block diagram of a computing system that includes an alignment system, in accordance with some embodiments of the present disclosure.

In the embodiment of FIG. 4, a computing system 400 includes one or more user systems 410, a network 416, an application software system 430, an alignment system 450. an event logging service 440, and a data storage system 440. All or at least some components of the alignment system 450 can be implemented at the user system 410, in some implementations. For example, the alignment system 450 can be implemented directly upon a single client device and/or the application software system 430 without the need to communicate with, e.g., one or more servers over the Internet.

A user system 410 includes at least one computing device, such as a personal computing device, a server, a mobile computing device, or a smart appliance, and at least one software application that the at least one computing device is capable of executing, such as an operating system or a front end of an online system. Many different user systems 410 can be connected to network 416 at the same time or at different times. Different user systems 410 can contain similar components as described in connection with the illustrated user system 410. For example, many different end users of computing system 400 can be interacting with many different instances of application software system 430 through their respective user systems 410, at the same time or at different times.

User system 410 includes a user interface 412. In some embodiments, user interface 412 is installed on or accessible to user system 410 by network 416. The user interface 412 can include, for example, a graphical display screen that includes graphical user interface elements such as at least one input box or other input mechanism and at least one slot. A slot as used herein refers to a space on a graphical display such as a web page or mobile device screen, into which natural language text can be entered by a user and/or user selections are received. The locations and dimensions of a particular graphical user interface element on a screen are specified using, for example, a markup language such as HTML (Hypertext Markup Language). On a typical display screen, a graphical user interface element is defined by two-dimensional coordinates. In other implementations such as virtual reality or augmented reality implementations, a slot may be defined using a three-dimensional coordinate system.

In some implementations, user interface 412 enables the user to upload, download, receive, send, or share of other types of digital content items, including posts, articles, comments, and shares, to initiate user interface events, and to view or otherwise perceive output such as data and/or digital content produced by application software system 430 and/or content distribution service 438. For example, user interface 412 can include a graphical user interface (GUI), a conversational voice/speech interface, a virtual reality, augmented reality, or mixed reality interface, and/or a haptic interface. User interface 412 includes a mechanism for logging in to application software system 430, clicking or tapping on GUI user input control elements, and interacting with digital content. Examples of user interface 412 include web browsers, command line interfaces, and mobile app front ends. User interface 412 as used herein can include application programming interfaces (APIs).

In the example of FIG. 4, user interface 412 includes a front-end user interface component of application software system 430. For example, user interface 412 can be directly integrated with other components of any user interface of application software system 430. In some implementations, access to content of the application software system 430 is limited to registered users of application software system 430.

Network 416 includes an electronic communications network. Network 416 can be implemented on any medium or mechanism that provides for the exchange of digital data, signals, and/or instructions between the various components of computing system 400. Examples of network 416 include, without limitation, a Local Area Network (LAN), a Wide Area Network (WAN), an Ethernet network or the Internet, or at least one terrestrial, satellite or wireless link, or a combination of any number of different networks and/or communication links.

Application software system 430 is any type of application software system that provides or enables at least one form of digital content distribution of content items (e.g., from the content item data store 420) to users at user systems such as 410. Examples of application software system 430 include but are not limited to connections network software, such as social media platforms, and systems that are or are not based on connections network software, such as general-purpose search engines, job search software, recruiter search software, sales assistance software, content distribution software, learning and education software, or any combination of any of the foregoing.

Application software system 430 includes any type of application software system that provides or enables the creation, upload, display, and/or distribution of at least one form of digital content, including user profiles, articles, comments, and videos between or among user systems, such as user system 410, through user interface 412. In some implementations, portions of the alignment system 450 are components of application software system 430. Components of application software system 430 can include entity graph 432, knowledge graph 434, user connection network 436, content distribution service 438, language model 442, prompt manager 444, and training manager 446.

In the example of FIG. 4, application software system 430 includes an entity graph 432 and/or a knowledge graph 434. Entity graph 432 and/or knowledge graph 434 include data organized according to graph-based data structures that can be traversed via queries and/or indexes to determine relationships between entities. An example of an entity graph is shown in FIG. 5, described herein. For example, as described in more detail with reference to FIG. 5, entity graph 432 and/or knowledge graph 434 can be used to compute various types of affinity scores, similarity measurements, and/or statistics between, among, or relating to entities.

Entity graph 432, 434 includes a graph-based representation of data stored in data storage system 440, described herein. For example, entity graph 432, 434 represents entities, such as users, organizations, and content items, such as posts, articles, comments, and shares, as nodes of a graph. Entity graph 432, 434 represents relationships, also referred to as mappings or links, between or among entities as edges, or combinations of edges, between the nodes of the graph. In some implementations, mappings between different pieces of data used by application software system 430 are represented by one or more entity graphs. In some implementations, the edges, mappings, or links indicate online interactions or activities relating to the entities connected by the edges, mappings, or links. For example, if a first user views an article posted by a second user, an edge may be created connecting the first user and the article, where the edge may be tagged with a label such as "viewed."

Portions of entity graph 432, 434 can be automatically re-generated or updated from time to time based on changes and updates to the stored data, e.g., updates to entity data and/or activity data. Also, entity graph 432, 434 can refer to an entire system-wide entity graph or to only a portion of a system-wide graph. For instance, entity graph 432, 434 can refer to a subset of a system-wide graph, where the subset pertains to a particular user or group of users of application software system 430.

In some implementations, knowledge graph 434 is a subset or a superset of entity graph 432. For example, in some implementations, knowledge graph 434 includes multiple different entity graphs 432 that are joined by edges. For instance, knowledge graph 434 can join entity graphs 432 that have been created across multiple different databases or across different software products. In some implementations, knowledge graph 434 includes a platform that extracts and stores different concepts that can be used to establish links between data across multiple different software applications. Examples of concepts include topics, industries, and skills.

Knowledge graph 434 includes a graph-based representation of data stored in data storage system 440, described herein. Knowledge graph 434 represents relationships, also referred to as links or mappings, between entities or concepts as edges, or combinations of edges, between the nodes of the graph. In some implementations, mappings between different pieces of data used by application software system 430 or across multiple different application software systems are represented by the knowledge graph 434.

User connection network 436 includes, for instance, a social network service, professional social network software and/or other social graph-based applications. Application software system 430 can include, for example, online systems that provide social network services, general-purpose search engines, specific-purpose search engines, messaging systems, content distribution platforms, e-commerce software, enterprise software, or any combination of any of the foregoing or other types of software.

A front-end portion of application software system 430 can operate in user system 410, for example as a plugin or widget in a graphical user interface of a web application, mobile software application, or as a web browser executing user interface 412. In an embodiment, a mobile app or a web browser of a user system 410 can transmit a network communication such as an HTTP (HyperText Transfer Protocol) request over network 416 in response to user input that is received through a user interface provided by the web application, mobile app, or web browser, such as user interface 412. A request is formulated, e.g., by a browser or mobile app at a user device, in connection with a user interface event such as uploading or storing a digital content item. The request includes, for example, a network message such as an HTTP request to store a digital content (e.g., a transfer of data from an application front end to the application's back end, or from the application's back end to the front end, or, more generally, a request for a transfer of data between two different devices or systems, such as data transfers between servers and user systems). A server running application software system 430 can receive the input from the web application, mobile app, or browser executing user interface 412, perform at least one operation using the input, and return output to the user interface 412 using a network communication such as an HTTP response, which the web application, mobile app, or browser receives and processes at the user system 410.

In the example of FIG. 4, application software system 430 includes a content distribution service 438. The content distribution service 438 can include a data storage service, such as a web server, which stores digital content items, uploaded by users, created by users, and/or searched for by users. Content distribution service 438 includes, for example, a chatbot or chat-style system, a messaging system, such as a peer-to-peer messaging system that enables the creation and exchange of messages among users of application software system 430, or a news feed. In some embodiments, the content distribution service 438 includes the chat system 160 described in FIG. 1 Generated content can be stored in storage system 440 as content items of the content item data store 420. In some implementations, content distribution service 438 interfaces with application software system 430, for example, via one or more application programming interfaces (APIs).

An API refers to an interface or communication protocol in a predefined format between a client and a server, for instance. In response to receiving an API call, an action is initiated and generally a response is communicated. For example, the implementation of the chat system 160 described in FIG. 1 can include an API call to the language model 442. Responsive to receiving the API call, the language model 442 generates natural language text for a turn of a conversation including a user at user system 410 that initiated the chat system via the content distribution service 438. In some embodiments, the content distribution service 438 receives the API response and configures the natural language text of the response to be displayed to the user via user interface 412.

In the example of FIG. 4, the application software system 430 includes a language model 442. The language model 442 is a pretrained machine learning model that has been pretrained to perform general tasks using-domain neutral data. In some embodiments, language model 442 is a generative pretrained transformer (GPT) machine learning model. In other embodiments, language model 442 is a Bidirectional Encoder Representation for Transformers (BERT). In operation, the language model 442 can be any sequence-to-sequence machine learning model. For example, the language model 442 can include an instance of a text-based encoder-decoder model that accepts a string as an input and outputs a string. The language model 442 is trained on domain-neutral data (e.g., publicly available data) to perform one or more domain-neutral tasks. The language model 442 can be pretrained using any training method such as supervised learning, unsupervised learning, semi-supervised learning, reinforcement learning, etc. In operation, the language model 442 is configured to generate a list of candidate recommendations for a user based on information associated with the user and a user-entered search query.

In the example of FIG. 4, the application software system 430 includes a prompt manager 444. The prompt manager 444 is used to trigger RAG, which allows language model 442 to obtain domain-specific information associated with the application software system 430. In other words, the prompt manager 444 configures a prompt such that the language model 442 can query knowledge sources such as content item data store 420, entity graph 432 and/or knowledge graph 434. In some embodiments, the prompt manager 444 queries the knowledge sources and includes the domain-specific information into the prompt for the language model 442.

In the example of FIG. 4, the application software system 430 includes a training manager 446. The training manager 446 can jointly train the ranking manager 452 and the context ranking manager 454 to generate context-aware recommendations. The context-aware recommendations are personalized with respect to the real-time needs of the user given a conversation of the user and diverse with respect to the order of the content recommendations.

In the example of FIG. 4, the application software system 430 includes an alignment system 450. The alignment system 450 is used to align an ordered list of content recommendations determined by a pretrained language model (e.g., language model 442). The alignment system 450 shifts the burden of user personalization from the language model 442 to the alignment system 450.

The alignment system 450 includes a ranking manager 452 and a context ranking manager 454. The ranking manager 452 re-ranks candidate recommendations determined by a domain-neutral language model (e.g., language model 442) according to a specific user need based on historic interactions of that user. The ranking manager 452 uses a real-time loss to adjust the candidate recommendations determined by the language model 442. The real-time loss represents an adjustment to the candidate recommendations to align the candidate recommendations with a more accurate ordered ranking based on a history of user interactions.

The context ranking manager 454 further adjusts or modifies ordered content recommendations by optimizing a permutation of the ordered content recommendations. The optimized permutation accounts for one or more attributes of each recommendation of the candidate recommendations determined by the language model 442, making the optimized permutation of the ordered content recommendations (e.g., the context-aware content recommendations) more diverse than the order of the adjusted recommendations (determined by the ranking manager 452 and/or the candidate recommendations determined by the language model 442).

Event logging service 470 captures and records network activity data generated during operation of application software system 430, including user interface events generated at user systems 410 via user interface 412, in real time, and formulates the user interface events into a data stream that can be consumed by, for example, a stream processing system. Examples of network activity data include clicks on messages or graphical user interface control elements, the creation, editing, sending, and viewing of messages, and social action data such as likes, shares, comments. For instance, when a user of application software system 430 via a user system 410 clicks on a user interface element, such as a message, a link, or a user interface control element such as a view, comment, share, or uploads a file, or creates a message, loads a web page, or scrolls through a feed, etc., event logging service 470 fires an event to capture an identifier, such as a session identifier, an event type, a date/timestamp at which the user interface event occurred, and possibly other information about the user interface event, such as the impression portal and/or the impression channel involved in the user interface event. Examples of impression portals and channels include, for example, device types, operating systems, and software platforms, e.g., web or mobile. For instance, when a user clicks on an article to view hosted on the application software system 430, event logging service 470 stores the corresponding event data in a log. Event logging service 470 generates a data stream that includes a record of real-time event data for each user interface event that has occurred.

Data storage system 440 includes data stores and/or data services that store digital data received, used, manipulated, and produced by application software system 430 and/or alignment system 450, including a content item data store 420 and training data store 422.

The content item data store 420 stores digital content items hosted by the application software system 430, generated by the application software system 430, uploaded to the application software system 430, and the like. In some embodiments, digital content is tagged with privacy settings such that only users with one or more credentials have access to the tagged digital content. Content items stored in content item data store 420 can include job postings, comments, resumes, and articles (e.g., content data 106*c* described in FIG. 1). In some embodiments, content items include unstructured data. Unstructured data includes files stored without metadata or a predetermined format such as free-form text (e.g., one or more words, phrases, or sentences). In some embodiments, content items include structured data. Structured data is data in a predetermined format (e.g., JSON format, bullet points). In some embodiments, the content item data store 420 includes other types of content such as profile data 106*b* described in FIG. 1 and/or entity connection data 106*a* described in FIG. 1.

The training data store 422 stores pairs of training data (e.g., input-output pairs) used to jointly train the ranking manager 452 and the context ranking manager 454. For example, an input of the input-output pair can include a tensor including $[v, x, H_v, <y_1, l_1><y_2, l_2> \ldots <y_n, l_n>]$, where v represents a user that entered a query, x represents the query $y_1 \ldots y_n$ represent n candidate recommendations determined by the language model 442, l represents the positive or negative feedback associated with each content recommendation of the candidate recommendations, and $H_v$ represents a vector or matrix collection of user v interactions within a predetermined time period. The output corresponding to input (e.g., the output of the input-output pair) is a content recommendation selected by the user. In some embodiments, the training data of the training data store 422 is updated frequently to maintain an accurate representation of a user's needs by updating the history of past user interactions of the user Hy.

In some embodiments, the data storage system 440 includes multiple different types of data storage and/or a distributed data service. As used herein, data service may refer to a physical, geographic grouping of machines, a logical grouping of machines, or a single machine. For example, a data service may be a data center, a cluster, a group of clusters, or a machine. Data stores of the data storage system 440 can be configured to store data produced in real-time and/or offline (e.g., batch) data processing. Data stored in real time is data that is stored as soon as the data is received by the data storage system 440. A data store configured for real-time data processing can be referred to as a real-time data store. A data store configured for offline or batch data processing can be referred to as an offline data store. Data stores can be implemented using databases, such as key: value stores, relational databases, and/or graph databases. Data can be written to and read from data stores using query technologies, e.g., SQL or NoSQL.

A key: value database, or key: value store, is a nonrelational database that organizes and stores data records as key: value pairs. The key uniquely identifies the data record, i.e., the value associated with the key. The value associated with a given key can be, e.g., a single data value, a list of data values, or another key: value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

The data storage system 440 resides on at least one persistent and/or volatile storage device that can reside within the same local network as at least one other device of computing system 400 and/or in a network that is remote relative to at least one other device of computing system 400. Thus, although depicted as being included in computing system 400, portions of data storage system 440 can be part of computing system 400 or accessed by computing system 400 over a network, such as network 416.

While not specifically shown, it should be understood that any of user system 410, application software system 430, alignment system 450, event logging service 470, and data storage system 440 includes an interface embodied as computer programming code stored in computer memory that when executed causes a computing device to enable bidirectional communication with any other of user system 410, application software system 430, alignment system 450, event logging service 470, or data storage system 440 using a communicative coupling mechanism. Examples of communicative coupling mechanisms include network interfaces, inter-process communication (IPC) interfaces and application program interfaces (APIs).

Each of user system 410, application software system 430, alignment system 450, event logging service 470, and data storage system 440 is implemented using at least one computing device that is communicatively coupled to electronic communications network 416. Any of user system 410, application software system 430, alignment system 450, event logging service 470, and data storage system 440 can be bidirectionally communicatively coupled by network 416. User system 410 as well as other different user systems (not shown) can be bidirectionally communicatively coupled to application software system 430.

Terms such as component, system, and model as used herein refer to computer implemented structures, e.g., combinations of software and hardware such as computer programming logic, data, and/or data structures implemented in electrical circuitry, stored in memory, and/or executed by one or more hardware processors.

The features and functionality of user system 410, application software system 430, alignment system 450, event logging service 470, and data storage system 440 are implemented using computer software, hardware, or software and hardware, and can include combinations of automated functionality, data structures, and digital data, which are represented schematically in the figures. User system 410, application software system 430, alignment system 450, event logging service 470, and data storage system 440 are shown as separate elements in FIG. 4 for case of discussion but, except as otherwise described, the illustration is not meant to imply that separation of these elements is required. The illustrated systems, services, and data stores (or their functionality) of each of user system 410, application software system 430, alignment system 450, event logging service 470, and data storage system 440 can be divided over any number of physical systems, including a single physical computer system, and can communicate with each other in any appropriate manner.

FIG. 5 is an example of an entity graph in accordance with some embodiments of the present disclosure.

The entity graph 500 can be used by an application software system, e.g., to support a user connection network, in accordance with some embodiments of the present disclosure. The entity graph 500 can be used (e.g., queried or traversed) to obtain or generate input data (such as input data 106 described in FIG. 1), which is used by the prompt generator (e.g., prompt generator 110 described in FIG. 1) to generate a prompt input for a machine learning model (e.g., language model 120 described in FIG. 1).

An entity graph includes nodes, edges, and data (such as labels, weights, or scores) associated with nodes and/or edges. Nodes can be weighted based on, for example, edge counts or other types of computations, and edges can be weighted based on, for example, affinities, relationships, activities, similarities, or commonalities between the nodes connected by the edges, such as common attribute values (e.g., two users have the same job title or employer, or two users are n-degree connections in a user connection network).

A graphing mechanism is used to create, update and maintain the entity graph. In some implementations, the graphing mechanism is a component of the database architecture used to implement the entity graph 500. For instance, the graphing mechanism can be a component of data storage system 440 and/or application software system 430, shown in FIG. 4, and the entity graphs created by the graphing mechanism can be stored in one or more data stores of data storage system 440.

The entity graph 500 is dynamic (e.g., continuously updated) in that it is updated in response to occurrences of interactions between entities in an online system (e.g., a user connection network) and/or computations of new relationships between or among nodes of the graph. These updates are accomplished by real-time data ingestion and storage technologies, or by offline data extraction, computation, and storage technologies, or a combination of real-time and offline technologies. For example, the entity graph 500 is updated in response to user updates of user profiles, user connections with other users (suggested as content recommendations, for instance), and user creations of new content items, such as messages, posts, articles, comments, and shares.

The entity graph 500 includes a knowledge graph that contains cross-application links. For example, message activity data obtained from a messaging system can be linked with entities of the entity graph.

In the example of FIG. 5, entity graph 500 includes entity nodes, which represent entities, such as content item nodes (e.g., Article 1, Article 2, Comment U1), and user nodes (e.g., User 1, User 2, User 3, User 4, User 5). Entity graph 500 also includes characteristic nodes, which represent characteristics (e.g., profile data, topic data) of entities. Examples of characteristic nodes include title nodes (e.g., Title U1, Topic 1), company nodes (e.g., Company 1), topic nodes (Topic 1, Topic 2), and skill nodes (e.g., Skill 1).

Entity graph 500 also includes edges. The edges individually and/or collectively represent various different types of relationships between or among the nodes. Data can be linked with both nodes and edges. For example, when stored in a data store, each node is assigned a unique node identifier and each edge is assigned a unique edge identifier. The edge identifier can be, for example, a combination of the node identifiers of the nodes connected by the edge and a timestamp that indicates the date and time at which the edge was created. For instance, in the graph 500, edges between user nodes can represent online social connections between the users represented by the nodes, such as 'friend' or 'follower' connections between the connected nodes.

The graphic representation of nodes and edges provides information that can be used by a machine learning model (e.g., language model 120 and/or alignment system 150 described in FIG. 1 or language model 442 and/or alignment system 450 described in FIG. 4) to generate an ordered set of content recommendations (e.g., ranked content recommendations). For example, values associated with user-selected attributes can be obtained from traversing the graph 500. Additionally or alternatively, traversing the nodes and edges of graph 500 can be used to interpret interest, represented by an affinity score. For instance, a user can be interested in a topic, a user can be interested in another user employed by a company, or a user can be interested in another user that has a certain skill. In the example entity graph 500, the user represented by the User 4 node clicked on the article represented by the Article 1 node by virtue of the CLICKED ON edge. Similarly, the user represented by the User 4 has viewed the article represented by the Article 2 node by virtue of the VIEWED edge. Both the Article 1 node and Article 2 node describe Topic 1 represented by the Topic 1 node, by virtue of the DESCRIBES edge. Accordingly, the traversal of the entity graph 500 indicates a user, represented by the User 4 node, has an interest in Topic 1, represented by the Topic 1 node.

Combinations of nodes and edges can be used to compute affinity scores or other scores used by various components of the machine learning model (e.g., language model 120 and/or alignment system 150 described in FIG. 1 or language model 442 and/or alignment system 450 described in FIG. 4) to generate ranked content recommendations. For example, a score that measures the affinity of the user represented by the User 4 node to the Topic 1 represented by the Topic 1 node can be computed using a path p1 that includes a sequence of edges between the nodes User 4 and Article 2, and/or a path p2 that includes a sequence of edges between the nodes User 4 and Comment U1 and/or a path p3 that includes a sequence of edges between the nodes User 4 and Article 1. Any one or more of the paths p1, p2, p3 and/or other paths through the graph 500 can be used to compute scores that represent affinities, relationships, or statistical correlations between different nodes. For instance, based on relative edge counts, a user-topic affinity score computed between User 4 and Topic 1 might be higher than the user-topic affinity score computed between User 4 and Topic 2 (e.g., represented by path p4 that includes a sequence of edges between User 4, User 3, User 1, and Company 1). For instance, at least three paths p1,p2,p3 can be traversed between User 4 and Topic 1, whereas at least one path p4 can be traversed between User 4 and Topic 2, indicating a higher user-topic affinity score of Topic 1 with respect to Topic 2. Determining a user interest, represented by an affinity score, for instance, can be used when the machine learning model is determining whether a content recommendation will be relevant to the user and therefore, whether the user will likely click on the content recommendation. For example, a machine learning model can rank a content recommendation associated with a user interest (determined by graph 500 for instance), higher than a content recommendation that is not associated with a user interest.

In the entity graph 500, edges can represent activities involving the entities represented by the nodes connected by the edges. For example, a POSTED edge between the User 1 node and the Comment U1 node indicates that the user represented by the User 1 node posted the digital comment represented by the Comment U1 node to the application software system (e.g., as a comment involving Topic 1). Similarly. the CLICKED edge between the User 4 node and the Article 1 node indicates that the user represented by the User 4 node clicked on the article represented by the Article 1 node, and the LIKED edge between the User 4 node and the Comment U1 node indicates that the user represented by the User 4 node liked the content item represented by the Comment U1 node.

The examples shown in FIG. 5 and the accompanying description, above are provided for illustration purposes. This disclosure is not limited to the described examples.

Figure 6:
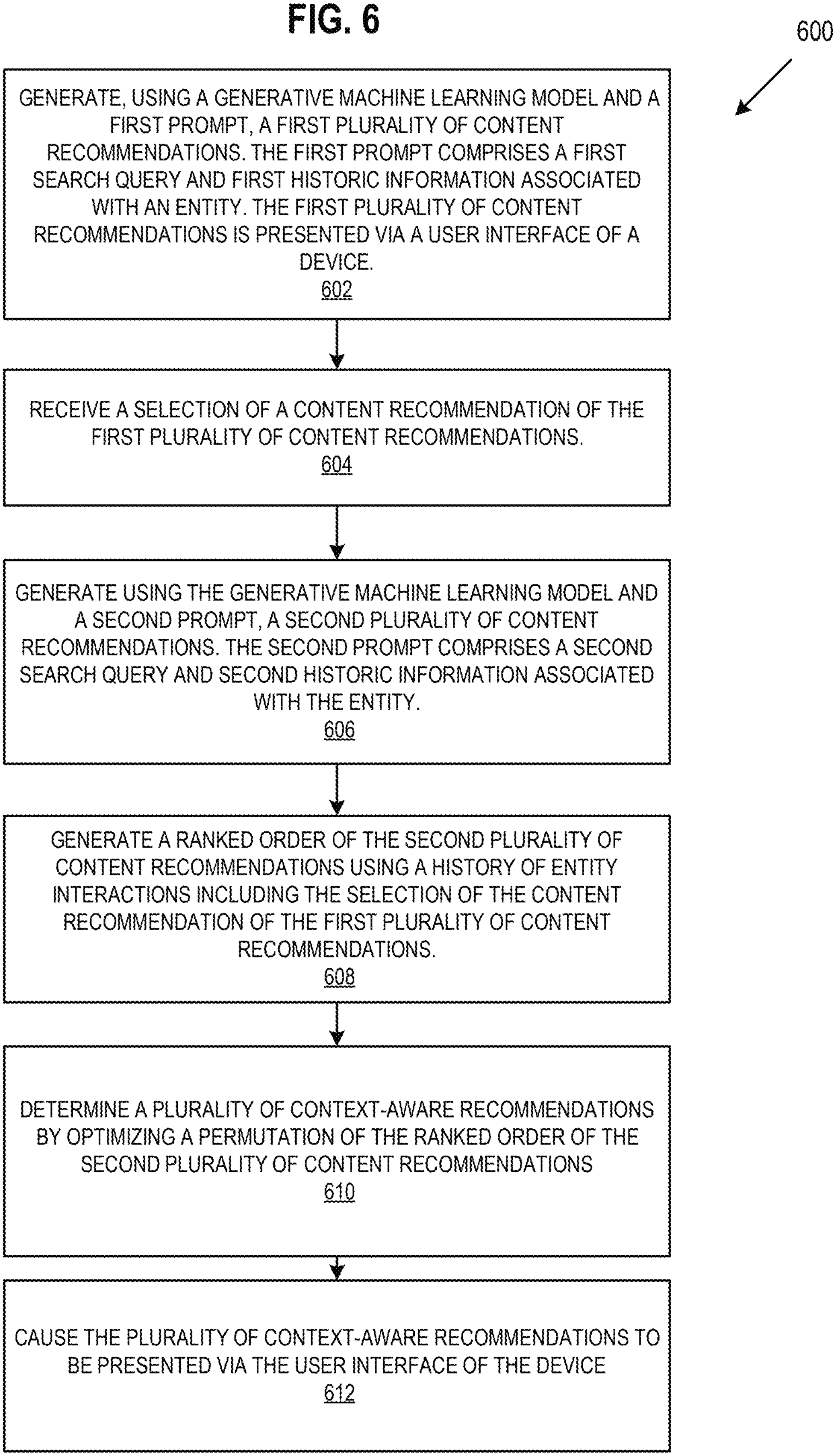
FIG. 6 is a flow diagram of an example method for generating a ranked list of content recommendations, in accordance with some embodiments of the present disclosure.

FIG. 6 is a flow diagram of an example method for generating a ranked list of content recommendations, in accordance with some embodiments of the present disclosure.

The method 600 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, one or more portions of method 600 is performed by one or more components of the alignment system 450 of FIG. 4, or the alignment system 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

At operation 602, a processing device generates, using a generative machine learning model and a first prompt, a first plurality of content recommendations. The first prompt comprises a first search query and first historic information associated with an entity. The first plurality of content recommendations is presented via a user interface of a device.

As described with reference to FIG. 1, the generative machine learning model can be the language model 120, which is trained on domain-neutral data. The generative machine learning model performs a task described in the first prompt such as generating a ranked order of digital content items based on a relevance of the digital content items to an entity such as a user. The user information and digital content items can be provided to the generative machine learning model using RAG. That is, the first prompt can include historic information associated with a user obtained using RAG (such as entity connection data 106*a* and/or profile data 106*b* described in FIG. 1). In some embodiments, the generative machine learning model can determine whether digital content items are relevant to a user based on the quality of the digital content item, where high-quality digital content items are content recommendations associated with a likelihood of positive user interaction that meets or exceeds a user engagement threshold. High-quality content recommendations include a content recommendation (e.g., a digital content item) that includes one or more topics referred to in a search query and match the user search intent.

At operation 604, the processing device receives a selection of a content recommendation of the first plurality of content recommendations. For example, an entity such as a user can interact with a content recommendation from the ranked list of content recommendations determined by the generative machine learning model. The interaction with the content recommendation can be any interaction between the user and a content recommendation such as clicking on the content recommendation, liking the content recommendation, saving the content recommendation, sharing the content recommendation, or any other downstream action associated with the content recommendation (e.g., sending a message to a user associated with a user profile that is recommended as a content recommendation).

At operation 606, the processing device generates, using the generative machine learning model and a second prompt, a second plurality of content recommendations. The second prompt comprises a second search query and second historic information associated with the entity such as the user. The generative machine learning model can receive a second query included in a prompt. The prompt can include user information and digital content items obtained using RAG, for instance. In some implementations, the user information in the first prompt is different from the user information in the second prompt because of changes or updates associated with the user. For example, the user may connect with another user, resulting in an updated entity graph such that the entity connection data received by the generative machine learning model is changed.

At operation 608, the processing device generates a ranked order of the second plurality of content recommendations using a history of entity interactions including the selection of the content recommendation of the first plurality of content recommendations. In some implementations, the history of entity interactions includes entity interactions associated with the entity during a time period. For example, the needs or an entity such as a user can dynamically change over a period of time. Accordingly, the history of entity interactions is limited to a time period to capture the needs of the entity in real-time or near real time. For example, the history of the entity interactions can include positive entity interactions and/or negative entity interactions (e.g., ignoring a content recommendation in the candidate list of content recommendations) over the course of a conversation between a user and a chat system such that the history of the entity interactions represents the user's needs during the conversation (e.g., in real-time).

In some implementations, the history of entity interactions includes one or more content recommendations generated by the generative machine learning model. In those implementations, only recommendations generated by the generative machine learning model and positively interacted with are stored in the history of entity interactions.

In some implementations, generating the ranked order of the second plurality of content recommendations further comprises executing a machine learning model to generate a context, wherein the context is used to adjust a probability score of one or more content recommendations of the second plurality of content recommendations. For example, the ranking manager described herein includes feed forward neural networks that generate embedding representations of the history of entity interactions and the second plurality of content recommendations respectively. The ranking manager combines the embedding representations to generate context. The context is used to re-score the probability distribution associated with the second plurality of content recommendations. In other words, the probability of a content recommendation being relevant to a user (represented by a probability score) is adjusted based on the context determined by the ranking manager.

In some implementations, the ranking manager used to generate the context is trained using a real time loss that is based on the history of entity interactions and the second plurality of content recommendations. For example, during a training period, the loss between a target recommendation (e.g., a recommendation interacted with by the entity such as the selected content recommendation) and the context is determined. This loss represents the difference between the second plurality of content recommendations determined by the generative machine learning model and the domain-specific real-time need of the entity. The loss is minimized by making adjustments to the second plurality of content recommendations (e.g., by adjusting the probability score of one or more content recommendations of the second plurality of content recommendations).

At operation 610, the processing device determines a plurality of context-aware recommendations by optimizing a permutation of the ranked order of the second plurality of content recommendations. The plurality of context-aware recommendations include the second plurality of content recommendations arranged in an order based on one or more attributes of each recommendation of the second plurality of content recommendations. Accordingly, the order of the context-aware recommendations is more diverse than the order of the second plurality of content recommendations. The context-aware recommendations are personalized with respect to an entity such as a user who entered the query, contextualized given the interactions of the user and (e.g., the history of entity interactions), and contextualized given the second plurality of content recommendations.

In some implementations, determining the plurality of context-aware recommendations further includes generating a number of ranked lists for each recommendation of the second plurality of content recommendations and selecting a ranked list from the number of ranked lists that maximizes a reward function. The reward function maximizes a likelihood of a user interacting with a content recommendation at a position of the ranked list, given the context.

At operation 612, the processing device causes the plurality of context-aware recommendations to be presented via the user interface of the device. In some implementations, the context-aware recommendations are presented to an entity such as a user in a conversation format. For example, the plurality of context-aware recommendations can be included in a natural language response generated by the generative machine learning model FIG. 7 is a block diagram of an example computer system including an alignment system, in accordance with some embodiments of the present disclosure.

Figure 7:
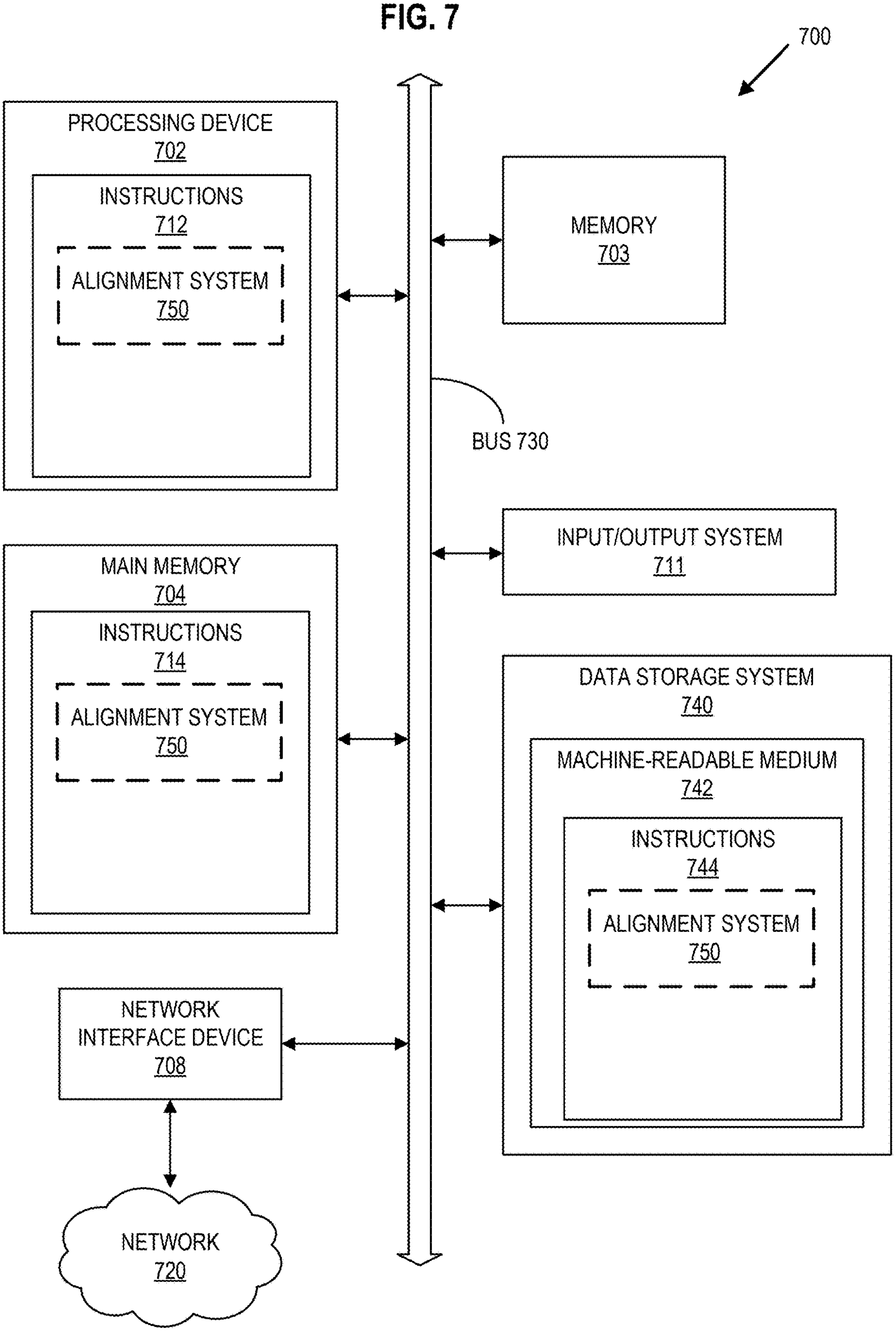
FIG. 7 is a block diagram of an example computer system including an alignment system, in accordance with some embodiments of the present disclosure.

In FIG. 7, an example machine of a computer system 700 is shown, within which a set of instructions for causing the machine to perform any of the methodologies discussed herein can be executed. In some embodiments, the computer system 700 can correspond to a component of a networked computer system (e.g., as a component of the alignment system 150 of FIG. 1 or the alignment system 450 of FIG. 4) that includes, is coupled to, or utilizes a machine to execute an operating system to perform operations corresponding to one or more components of the alignment system 150 of FIG. 1 or the alignment system 450 of FIG. 4. For example, computer system 700 corresponds to a portion of computing system 700 when the computing system is executing a portion of the alignment system 150 of FIG. 1.

The machine is connected (e.g., networked) to other machines in a network, such as a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a wearable device, a server, or any machine capable of executing a set of instructions (sequential or otherwise) that specify actions to be taken by that machine. Further, while a single machine is illustrated, the term “machine” includes any collection of machines that individually or jointly execute a set (or multiple sets) of instructions to perform any of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a memory 703 (e.g., flash memory, static random access memory (SRAM), etc.), an input/output system 711, and a data storage system 740, which communicate with each other via a bus 730.

Processing device 702 represents at least one general-purpose processing device such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be at least one special-purpose processing device such as an application specific integrated circuit (ASIC), a field programmable gate array (FPGA), a digital signal processor (DSP), network processor, or the like. The processing device 702 is configured to execute instructions 712 for performing the operations and steps discussed herein.

In some embodiments of FIG. 7, alignment system 750 represents portions of alignment system 450 of FIG. 4 and/or alignment system 150 of FIG. 1 when the computer system 700 is executing those portions of alignment system 750. Instructions 712 include portions of the alignment system 750 when those portions of the alignment system 750 are being executed by processing device 702. Thus, the alignment system 750 is shown in dashed lines as part of instructions 712 to illustrate that, at times, portions of the alignment system 750 are executed by processing device 702. For example, when at least some portion of the alignment system 750 is embodied in instructions to cause processing device 702 to perform the method(s) described herein, some of those instructions can be read into processing device 702 (e.g., into an internal cache or other memory) from main memory 704 and/or data storage system 740. However, it is not required that all of the alignment system 750 be included in instructions 712 at the same time and portions of the alignment system 750 are stored in at least one other component of computer system 700 at other times, e.g., when at least one portion of the alignment system 750 is not being executed by processing device 702.

The computer system 700 further includes a network interface device 708 to communicate over the network 720. Network interface device 708 provides a two-way data communication coupling to a network. For example, network interface device 708 can be an integrated-services digital network (ISDN) card, cable modem, satellite modem, or a modem to provide a data communication connection to a corresponding type of telephone line. As another example, network interface device 708 can be a local area network (LAN) card to provide a data communication connection to a compatible LAN. Wireless links can also be implemented. In any such implementation network interface device 708 can send and receive electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 700.

Computer system 700 can send messages and receive data, including program code, through the network(s) and network interface device 708. In the Internet example, a server can transmit a requested code for an application program through the Internet and network interface device 708. The received code can be executed by processing device 702 as it is received, and/or stored in data storage system 740, or other non-volatile storage for later execution.

The input/output system 711 includes an output device, such as a display, for example a liquid crystal display (LCD) or a touchscreen display, for displaying information to a computer user, or a speaker, a haptic device, or another form of output device. The input/output system 711 can include an input device, for example, alphanumeric keys and other keys configured for communicating information and command selections to processing device 702. An input device can, alternatively or in addition, include a cursor control, such as a mouse, a trackball, or cursor direction keys for communicating direction information and command selections to processing device 702 and for controlling cursor movement on a display. An input device can, alternatively or in addition, include a microphone, a sensor, or an array of sensors, for communicating sensed information to processing device 702. Sensed information can include voice commands, audio signals, geographic location information, haptic information, and/or digital imagery, for example.

The data storage system 740 includes a machine-readable storage medium 742 (also known as a computer-readable medium) on which is stored at least one set of instructions 744 or software embodying any of the methodologies or functions described herein. The instructions 744 can also reside, completely or at least partially, within the main memory 704 and/or within the processing device 702 during execution thereof by the computer system 700, the main memory 704 and the processing device 702 also constituting machine-readable storage media. In one embodiment, the instructions 744 include instructions to implement functionality corresponding to the application software system 430 of FIG. 4 (e.g., alignment system 150 of FIG. 1).

Dashed lines are used in FIG. 7 to indicate that it is not required that the alignment system 750 be embodied entirely in instructions 712, 714, and 744 at the same time. In one example, portions of the alignment system 750 are embodied in instructions 714, which are read into main memory 704 as instructions 714, and portions of instructions 712 are read into processing device 702 as instructions 712 for execution. In another example, some portions of the alignment system 750 are embodied in instructions 744 while other portions are embodied in instructions 714 and still other portions are embodied in instructions 712.

While the machine-readable storage medium 742 is shown in an example embodiment to be a single medium, the term "machine-readable storage medium" should be taken to include a single medium or multiple media that store the instructions. The term "machine-readable storage medium" shall also be taken to include any medium that is capable of storing or encoding a set of instructions for execution by the machine and that cause the machine to perform any of the methodologies of the present disclosure. The term "machine-readable storage medium" shall accordingly be taken to include, but not be limited to, solid-state memories, optical media, and magnetic media. The examples shown in FIG. 7 and the accompanying description above are provided for illustration purposes. This disclosure is not limited to the described examples.

Figure 8:
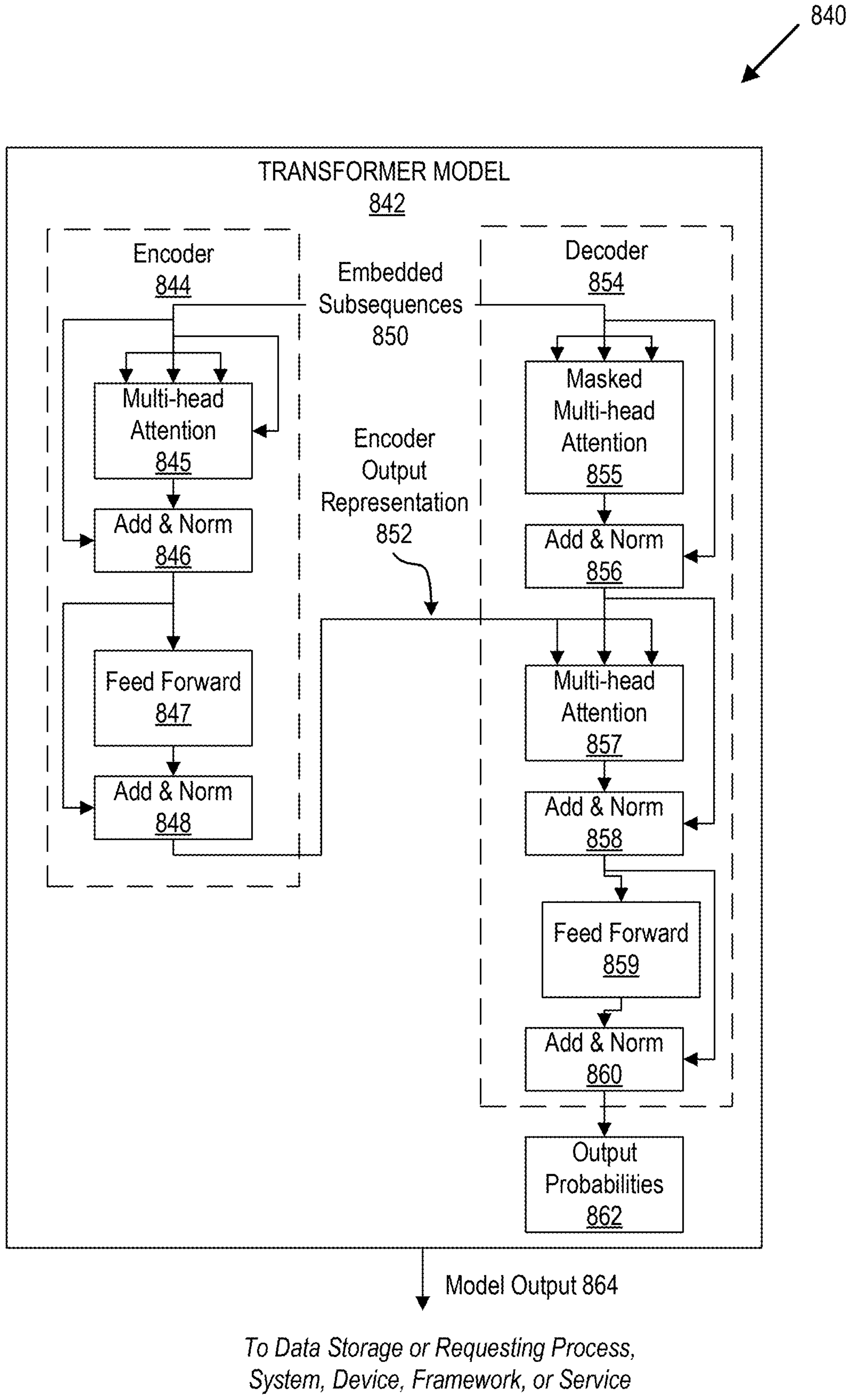
FIG. 8 is a block diagram of a machine learning model that can be used by and/or included in an alignment system, in accordance with some embodiments of the present disclosure.

FIG. 8 is a block diagram of a machine learning model that can be used by and/or included in an alignment system in accordance with some embodiments of the present disclosure.

A specific example of a deep neural network is a sequence to sequence model, which takes sequential data such as words, phrases, or images (sequences of characters, tokens, or pixel values) or time series data as input and outputs sequential data. An example of a sequence to sequence model is an encoder-decoder model. In an encoder-decoder model, a first neural network known as an encoder transforms the model input into an encoded version of the model input, e.g., an embedding or vector. For example, an encoder can transform a sentence or an image into a sequence of numbers. A second neural network known as the decoder takes the output of the encoder (e.g., the encoded version of the model input) and decodes it. For example, a decoder can transform the sequence of numbers created by the encoder into a translated sentence or another form of output. The encoder-decoder model is suitable for sequence-to-sequence problems such as computer vision and natural language processing (NLP) tasks such as machine translation.

A specific example of an encode-decoder model is a transformer model. A transformer model is a deep neural network encoder-decoder model that uses a technique called attention or self-attention to detect relationships and dependencies among data elements in a sequence. Transformer models can be applied to various NLP tasks and other machine learning tasks, such as generating content based on input attributes or tokens. For example, the attention mechanism can facilitate the detection of semantic relationships and contextual dependencies between words and phrases.

In the example of FIG. 8, a machine learning system 840 includes a transformer model 842. The transformer model 842 is constructed using a neural network-based machine learning model architecture. In some embodiments, the neural network-based architecture includes one or more self-attention layers (e.g., multi-head attention layer 845, masked multi-head attention layer 855, and multi-head attention layer 857) that allow the model to assign different weights to different features included in the model input. Alternatively, or in addition, the neural network architecture includes feed-forward layers (e.g., feed-forward layer 847 and feed-forward layer 859) and residual connections (e.g., add & norm layer 846, add & norm layer 848, add & norm layer 856, add & norm layer 858, add & norm layer 860) that allow the model to machine-learn complex data patterns including relationships between different states, actions, and rewards in multiple different contexts. In some embodiments, transformer model 842 is constructed using a transformer-based architecture that includes self-attention layers, feed-forward layers, and residual connections between the layers. The exact number and arrangement of layers of each type as well as the hyperparameter values used to configure the model are determined based on the requirements of a particular design or implementation of the user processing system.

As shown in FIG. 8, transformer model 842 feeds embedded subsequences 850 into encoder 844 and decoder 854. For example, transformer model 842 feeds inputs of embedded subsequences 850 into multi-head attention layer 845 of encoder 844. In some embodiments, inputs of embedded subsequences 850 are a series of tokens and the output of the encoder (e.g., encoder output representation 852), is a fixed-dimensional representation for each of the tokens of embedded subsequences 850 including an embedding for inputs of embedded subsequences 850. Transformer model 842 feeds encoder output representation 852 and embedded subsequences 850 into decoder 854 which generates a sequence of tokens based on encoder output representation 852 and the input embeddings. While a specific architecture of encoder 844 and decoder 854 is shown for simplicity, as explained above, the exact number and arrangement of layers of each type as well as the hyperparameter values used to configure the model are determined based on the requirements of a particular design or implementation. Transformer model 842 can therefore include different numbers, arrangements, and types of layers, such that each input token of embedded subsequences 850 is fed through the layers of transformer model 842 and is dependent on other input tokens of embedded subsequences 850.

Transformer model 842 illustrates a generic encoder/decoder model for simplicity. In such a model, encoder 844 encodes the input into a fixed-length vector (e.g., encoder output representation 852) and decoder 854 decodes the fixed-length vector into an output sequence. Encoder 844 and decoder 854 are trained together to maximize the conditional log-likelihood of the output given the input. For example, once trained, encoder 844 and decoder 854 can generate an output given an input sequence or can score a pair of input/output sequences based on their probability of coexistence.

As shown in FIG. 8, encoder 844 includes multi-head attention layer 845, add & norm layer 846, feed-forward layer 847, and add & norm layer 848. Multi-head attention layer 845 receives inputs of embedded subsequences 850 and computes output representations for each of the input tokens of embedded subsequences 850 based on the inputs of embedded subsequences 850. For example, multi-head attention layer 845 converts each input token of embedded subsequences 850 into queries, keys, and values using query, key, and value matrices. Multi-head attention layer 845 computes the output representation of the input tokens of embedded subsequences 850 as the weighted sum of the values of all of the input tokens of embedded subsequences 850. Multi-head attention layer 845 computes the weights for the weighted sum by applying a compatibility function to the corresponding key and query for the value. For example, multi-head attention layer 845 uses a scaled dot product on the key and query of an input token to determine a weight to apply to a value of the input token. Multi-head attention layer 845 includes multiple attention blocks which each compute an output representation for the input token. Multi-head attention layer 845 aggregates the output representations of these attention blocks to generate a final output representation for multi-head attention layer 845.

Inputs of embedded subsequences 850 include information associated with the application software system (such as application software system 130 described in FIG. 1) at a given timestamp. For example, inputs of embedded subsequences 850 include the input data 102 described in FIG. 1. Transformer model 842 feeds the output representation generated by multi-head attention layer 845 and residual connections from the inputs of embedded subsequences 850 into add & norm layer 846. By including these residual connections, transformer model 842 ensures that it does not "forget" features of embedded subsequences 850 during training. Forgetting in the context of machine learning can mean that as the model continues to be sequentially trained on different datasets, the model continually adjusts the values of feature coefficients based on the most recent datasets, thereby losing or diluting the effect on those coefficient values of the datasets used earlier in training.

Add & norm layer 846 sums the output representation generated by multi-head attention layer 845 and the residual connections from inputs of embedded subsequences 850 and applies a layer normalization to the result. In some embodiments, the add & normal layers also apply a SoftMax function to generate probabilities for the inputs of embedded subsequences 850. For example, the probability of a next token can be predicted in a natural language understanding context.

Transformer model 842 feeds the normalized output of add & norm layer 846 into feed-forward layer 847. Feed-forward layer 847 is a feed-forward network that receives the normalized output, feeds it through the hidden layers of feed-forward layer 847, and then feeds the output of feed-forward layer 847 into add & norm layer 848. Feed-forward layer 847 processes the information received from add & norm layer 846 and can update the hidden layers of feed-forward layer 847 based on the information (e.g., during training) and/or generate an output based on the hidden layers processing the information (e.g., during evaluation and/or inference). For example, during training, transformer model 842 updates the weights of the hidden layers of feed-forward layer 847 based on the inputs and the loss of the transformer system. Further details with regard to the loss of the transformer system as well as training objectives and metrics are discussed below. As an alternative example, during evaluation and/or inference, the weights of the hidden layers of feed-forward layer 847 are used to determine the output representation 852 of each of the input tokens of embedded subsequences 850.

Transformer model 842 feeds the output of feed-forward layer 847 into add & norm layer 848 as well as residual connections from the output of add & norm layer 846. Add & norm layer 848 sums the output of feed-forward layer 847 with the residual connections from add & norm layer 846 and applies a layer normalization to the result to generate encoder output representation 852. Transformer model 842 feeds encoder output representation 852 into multi-head attention layer 857 of decoder 854 as explained below.

Masked multi-head attention layer 855 receives outputs of embedded subsequences 850 and computes representations for each of the output tokens of embedded subsequences 850 based on masked outputs of embedded subsequences 850. For example, masked multi-head attention layer 855 computes representations for each of the output tokens of embedded subsequences 850 based on previous output tokens while masking future output tokens. Masked multi-head attention layer 855 therefore only computes representations using tokens that come before the token masked multi-head attention layer 855 is trying to predict.

Transformer model 842 feeds the representation generated by masked multi-head attention layer 855 and residual connections from the outputs of embedded subsequences 850 into add & norm layer 856. Add & norm layer 856 sums the representation generated by masked multi-head attention layer 855 and the residual connections from outputs of embedded subsequences 850 and applies a layer normalization to the result.

Transformer model 842 feeds the normalized output of add & norm layer 856 into multi-head attention layer 857. Multi-head attention layer 857 receives the normalized output of add & norm layer 856 as well as encoder output representation 852 from encoder 844 and generates a representation based on both.

Transformer model 842 feeds the representation generated by multi-head attention layer 857 and residual connections from the output of add & norm layer 856 into add & norm layer 858. Add & norm layer 858 sums the representation generated by multi-head attention layer 857 and the residual connections from the output of add & norm layer 856 and applies a layer normalization to the result.

Transformer model 842 feeds the normalized output of add & norm layer 858 into feed-forward layer 859. Feed-forward layer 859 is a feed-forward network that receives the normalized output, feeds it through the hidden layers of feed-forward layer 859, and then feeds the output of feed-forward layer 859 into add & norm layer 860. Feed-forward layer 859 processes the information received from add & norm layer 858 and can update the hidden layers of feed-forward layer 859 based on the information (e.g., during training) and/or generate an output based on the hidden layers processing the information (e.g., during evaluation and/or inference). For example, during training, transformer model 842 updates the weights of the hidden layers of feed-forward layer 859 based on the inputs and the loss of the transformer system. Further details with regard to the loss of the transformer system as well as training objectives and metrics are discussed below. As an alternative example, during evaluation and/or inference, the weights of the hidden layers of feed-forward layer 859 are used to determine the output of feed-forward layer 859.

Transformer model 842 feeds the output of feed-forward layer 859 into add & norm layer 860 as well as residual connections from the output of add & norm layer 858. Add & norm layer 860 sums the output of feed-forward layer 859 with the residual connections from add & norm layer 858 and applies a layer normalization to the result to generate an output.

Transformer model 842 generates output probabilities 862 from the output of add & norm layer 860. For example, transformer model 842 applies a linear transformation and a SoftMax function to the output of add & norm layer 860 to generate a normalized vector of output probabilities 862.

In some embodiments, such as during training, transformer model 842 determines a loss for the system based on output probabilities 862. For example, transformer model 842 uses deep quantile regression for training. In such an example, output probabilities 862 includes a mean prediction probability and estimations for the upper and lower bounds of the range of prediction such that output probabilities 626 includes an uncertainty range. In one embodiment, the loss function of transformer model 842 using deep quantile regression is represented by the following equation:

$$\mathcal{L}(\xi_i \mid \alpha) = \begin{cases} \alpha\xi_i & \text{if } \xi_i \geq 0, \\ (\alpha - 1)\xi_i & \text{if } \xi_i < 0 \end{cases},$$

where α is the required quantile (a value between 0 and 1 representing the desired quantile) and $\xi_i = y_i - f(x_i)$, where $f(x_i)$ is the mean predicted by output probabilities 862, $y_i$ are the outputs of embedded subsequences 850 and $x_i$ are the inputs of embedded subsequences 850. The loss over the entirety of a dataset of embedded subsequences 850 where embedded subsequences 850 has a length of N can be represented by the following equation:

$$\mathcal{L}(y, f \mid \alpha) = \frac{1}{N}\sum_{i=1}^{N}\mathcal{L}(y_i - f(x_i) \mid \alpha).$$

In such embodiments, output probabilities 862 includes three values: a mean prediction, a lower bound quantile, and an upper bound quantile. In some embodiments, transformer model 842 uses upper confidence bound or Thompson sampling. For example, transformer model 842 can determine model output 864 based on the mean prediction, the lower bound quantile, and the upper bound quantile based on upper confidence bound and/or Thompson sampling. As shown in FIG. 8, the model output 864 is passed to requesting processes such as the alignment system 150 described in FIG. 1.

The transformer model 842 is trained to optimize the model parameters using any loss function such as cross-entropy loss. Similarly, the add & norm layers can normalize their respective inputs using any normalization technique. For example, the add & norm layers of transformer model 842 normalize the weights according to the following equation: $w_i = C$, where c is a positive scalar used for global normalization. In some embodiments, the scalar c is predetermined.

Language models, including large language models and other generative models, can be implemented using transformer models. A generative model can be constructed using a neural network-based machine learning model architecture. In some implementations, the neural network-based architecture includes one or more input layers that receive task descriptions (or prompts), generate one or more embeddings based on the task descriptions, and pass the one or more embeddings to one or more other layers of the neural network. In other implementations, the one or more embedding are generated based on the task description by a pre-processor, the embeddings are input to the generative language model, and the generative language model outputs digital content, e.g., natural language text or a combination of natural language text and non-text output, based on the embeddings.

The neural network-based machine learning model architecture of the generative model can include one or more self-attention layers that allow the model to assign different weights to different portions of the model input (e.g., different words or phrases included in the model input). Alternatively or in addition, the neural network architecture includes feed-forward layers and residual connections that allow the model to machine-learn complex data patterns including relationships between different words or phrases in multiple different contexts. The language model or other type of generative model can be constructed using a transformer-based architecture that includes self-attention layers, feed-forward layers, and residual connections between the layers, as described herein.

In some examples, the neural network-based machine learning model architecture of a generative model includes or is based on one or more generative transformer models, one or more generative pre-trained transformer (GPT) models, one or more bidirectional encoder representations from transformers (BERT) models, one or more large language models (LLMs), one or more XLNet models, and/or one or more other natural language processing (NL) models that significantly advance the state-of-the-art in various linguistic tasks such as machine translation, sentiment analysis, question answering and sentence similarity. In some examples, the neural network-based machine learning model architecture includes or is based on one or more predictive content neural models that can receive digital content input and generate one or more outputs based on processing the digital content with one or more neural network models. Examples of predictive neural models include, but are not limited to, Generative Pre-Trained Transformers (GPT), BERT, and/or Recurrent Neural Networks (RNNs). In some examples, one or more types of neural network-based machine learning model architecture includes or is based on one or more multimodal neural networks capable of outputting different modalities (e.g., text, image, sound, etc.) separately and/or in combination based on digital content input. Accordingly, in some examples, a multimodal neural network is capable of outputting digital content that includes a combination of two or more of text, images, video or sound.

A generative language model can be trained on a large dataset of natural language text. For example, training samples of natural language text extracted from publicly available data sources can be used to train a generative language model. The size and composition of the dataset used to train the generative language model can vary according to the requirements of a particular design or implementation. In some implementations, the dataset used to train the generative language model includes hundreds of thousands to millions or more different natural language text training samples. In some embodiments, a generative language model includes multiple generative language models trained on differently sized datasets. For example, a generative language model can include a comprehensive but low capacity model that is trained on a large data set and used for generating examples, and the same generative language model also can include a less comprehensive but high capacity model that is trained on a smaller data set, where the high capacity model is used to generate outputs based on examples obtained from the low capacity model. In some implementations, supervised learning is used to further improve the output of the generative language model. In supervised learning, ground-truth examples of desired model output are paired with respective prompts, and these prompt-output pairs are used to train or fine tune the generative language model.

Prompt engineering is a technique used to optimize the structure and/or content of a prompt input to a generative model. Some prompts can include examples of outputs to be generated by the generative model (e.g., few-shot prompts), while other prompts can include no examples of outputs to be generated by the generative model (e.g., zero-shot prompts). Chain of thought prompting is a prompt engineering technique where the prompt includes a request that the model explain reasoning in the output. For example, the generative model performs the task described in the prompt using a series of steps and outputs reasoning as to each step performed.

Supervised learning is a method of training (or fine-tuning) a machine learning model given input-output pairs, where the output of the input-output pair is known (e.g., an expected output, a labeled output, a ground truth). Other training methods including semi-supervised learning or federated learning can be used to train a machine learning model or to fine-tune a pretrained machine learning model.

To train or fine tune a language model, a prompt is provided as input to the machine learning model. The prompt can include natural language instructions, queries, examples, etc. The machine learning model generates output by applying the weights and nodes of the machine learning model to the prompt. Error can be determined by comparing the model output to a reference or expected output. For example, the similarity between the model output and the expected output is evaluated using a similarity metric or model performance metric. The error is used to adjust the value of weights in a weight matrix included in the machine learning model and/or the number of layers and/or arrangement of layers included in the machine learning model.

A machine learning model can be trained using a backpropagation algorithm. The backpropagation algorithm operates by propagating the error through each of the algorithmic weights of the machine learning model such that the algorithmic weights are adjusted based on the amount of error. The error can be calculated at each iteration, batch, and/or epoch. The error is computed using a loss function. An example loss function includes the cross-entropy error function. After a number of training iterations, the machine learning model iteratively converges, e.g., adjusts weight values over time until the model output achieves an acceptable level of accuracy or reliability (e.g., accuracy satisfies a defined tolerance or confidence level). The values of the weights of the trained model (e.g., after convergence) are stored such that the machine learning model can be deployed during inference time.

The transformer model 842 can be configured and implemented as a network service. For example, the transformer model 842 can be configured using a machine learning library and an application programming interface (API), e.g., via an API call such as ML_library.model (p1, p2, . . . pn), where p indicates a parameter or argument of the call, such as a model hyperparameter or an input feature set identifier. Once configured, the transformer model 842 and/or its output can be hosted on one or more servers and/or data storage devices for accessibility to one or more requesting processes, systems, devices, frameworks, or services.

The examples shown in FIG. 8 and the accompanying description, above are provided for illustration purposes. This disclosure is not limited to the described examples. Additional or alternative details and implementations are described herein.

Some portions of the preceding detailed description have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100 or the computing system 700, can carry out the above-described computer-implemented methods in response to its processor executing a computer program (e.g., a sequence of instructions) contained in a memory or other non-transitory machine-readable storage medium (e.g., a non-transitory computer readable medium). Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The techniques described herein may be implemented with privacy safeguards to protect user privacy. Furthermore, the techniques described herein may be implemented with user privacy safeguards to prevent unauthorized access to personal data and confidential data. The training of the AI models described herein is executed to benefit all users fairly, without causing or amplifying unfair bias.

According to some embodiments, the techniques for the models described herein do not make inferences or predictions about individuals unless requested to do so through an input. According to some embodiments, the models described herein do not learn from and are not trained on user data without user authorization. In instances where user data is permitted and authorized for use in AI features and tools, it is done in compliance with a user's visibility settings, privacy choices, user agreement and descriptions, and the applicable law. According to the techniques described herein, users may have full control over the visibility of their content and who sees their content, as is controlled via the visibility settings. According to the techniques described herein, users may have full control over the level of their personal data that is shared and distributed between different AI platforms that provide different functionalities. According to the techniques described herein, users may choose to share personal data with different platforms to provide services that are more tailored to the users. In instances where the users choose not to share personal data with the platforms, the choices made by the users will not have any impact on their ability to use the services that they had access to prior to making their choice. According to the techniques described herein, users may have full control over the level of access to their personal data that is shared with other parties. According to the techniques described herein, personal data provided by users may be processed to determine prompts when using a generative AI feature at the request of the user, but not to train generative AI models. In some embodiments, users may provide feedback while using the techniques described herein, which may be used to improve or modify the platform and products. In some embodiments, any personal data associated with a user, such as personal information provided by the user to the platform, may be deleted from storage upon user request. In some embodiments, personal information associated with a user may be permanently deleted from storage when a user deletes their account from the platform.

According to the techniques described herein, personal data may be removed from any training dataset that is used to train AI models. The techniques described herein may utilize tools for anonymizing member and customer data. For example, user's personal data may be redacted and minimized in training datasets for training AI models through delexicalisation tools and other privacy enhancing tools for safeguarding user data. The techniques described herein may minimize use of any personal data in training AI models, including removing and replacing personal data. According to the techniques described herein, notices may be communicated to users to inform how their data is being used and users are provided controls to opt-out from their data being used for training AI models.

According to some embodiments, tools are used with the techniques described herein to identify and mitigate risks associated with AI in all products and AI systems. In some embodiments, notices may be provided to users when AI tools are being used to provide features.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

Additionally, as used in this disclosure, phrases of the form "at least one of an A, a B, or a C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Illustrative examples of the technologies disclosed herein are provided below. An embodiment of the technologies may include any of the examples described herein, or any combination of any of the examples described herein, or any combination of any portions of the examples described herein.

In some aspects, the techniques described herein relate to a method including: generating, using a generative machine learning model and a first prompt, a first plurality of content recommendations, wherein the first prompt includes a first search query and first historic information associated with an entity, and the first plurality of content recommendations is presented via a user interface of a device; receiving a selection of a content recommendation of the first plurality of content recommendations; generating, using the generative machine learning model and a second prompt, a second plurality of content recommendations, wherein the second prompt includes a second search query and second historic information associated with the entity; generating a ranked order of the second plurality of content recommendations using a history of entity interactions including the selection of the content recommendation of the first plurality of content recommendations; determining a plurality of context-aware recommendations by optimizing a permutation of the ranked order of the second plurality of content recommendations; and causing the plurality of context-aware recommendations to be presented via the user interface of the device.

In some aspects, the techniques described herein relate to a method, wherein the plurality of context-aware recommendations includes the second plurality of content recommendations arranged in an order based on one or more attributes of the second plurality of content recommendations.

In some aspects, the techniques described herein relate to a method, wherein the history of entity interactions includes one or more entity interactions associated with the entity during a time period.

In some aspects, the techniques described herein relate to a method, wherein the history of entity interactions includes one or more content recommendations generated by the generative machine learning model.

In some aspects, the techniques described herein relate to a method, wherein generating the ranked order of the second plurality of content recommendations further includes: executing a machine learning model to generate a context, wherein the context is used to adjust a probability score of one or more content recommendations of the second plurality of content recommendations.

In some aspects, the techniques described herein relate to a method, wherein the machine learning model is trained using a real-time loss that is based on the history of entity interactions and the second plurality of content recommendations.

In some aspects, the techniques described herein relate to a method, wherein determining the plurality of context-aware recommendations further includes: generating a number of ranked lists using the second plurality of content recommendations; and selecting a ranked list from the number of ranked lists that maximizes a reward function representing a maximum likelihood of the entity interacting with a content recommendation at a position of the ranked list given the context.

In some aspects, the techniques described herein relate to a system including: at least one processor; and at least one memory device coupled to the at least one processor, wherein the at least one memory device includes instructions that, when executed by the at least one processor, cause the at least one processor to perform at least one operation including: generating, using a generative machine learning model and a first prompt, a first plurality of content recommendations, wherein the first prompt includes a first search query and first historic information associated with an entity, and the first plurality of content recommendations is presented via a user interface of a device; receiving a selection of a content recommendation of the first plurality of content recommendations; generating, using the generative machine learning model and a second prompt, a second plurality of content recommendations, wherein the second prompt includes a second search query and second historic information associated with the entity; generating a ranked order of the second plurality of content recommendations using a history of entity interactions including the selection of the content recommendation of the first plurality of content recommendations; determining a plurality of context-aware recommendations by optimizing a permutation of the ranked order of the second plurality of content recommendations; and causing the plurality of context-aware recommendations to be presented via the user interface of the device.

In some aspects, the techniques described herein relate to a system, wherein the plurality of context-aware recommendations includes the second plurality of content recommendations arranged in an order based on one or more attributes of the second plurality of content recommendations.

In some aspects, the techniques described herein relate to a system, wherein the history of entity interactions includes one or more entity interactions associated with the entity during a time period.

In some aspects, the techniques described herein relate to a system, wherein the history of entity interactions includes one or more content recommendations generated by the generative machine learning model.

In some aspects, the techniques described herein relate to a system, wherein generating the ranked order of the second plurality of content recommendations further includes instructions that, when executed by the at least one processor, cause the at least one processor to perform at least one operation including: executing a machine learning model to generate a context, wherein the context is used to adjust a ranking score of one or more content recommendations of the second plurality of content recommendations.

In some aspects, the techniques described herein relate to a system, wherein the machine learning model is trained using a real-time loss that is based on the history of entity interactions and the second plurality of content recommendations.

In some aspects, the techniques described herein relate to a system, wherein determining the plurality of context-aware recommendations further includes instructions that, when executed by the at least one processor, cause the at least one processor to perform at least one operation including: generating a number of ranked lists using the second plurality of content recommendations; and selecting a ranked list from the number of ranked lists that maximizes a reward function representing a maximum likelihood of the entity interacting with a content recommendation at a position of the ranked list given the context.

In some aspects, the techniques described herein relate to a non-transitory machine-readable storage medium including instructions that, when executed by at least one processor, cause the at least one processor to perform at least one operation including: generating, using a generative machine learning model and a first prompt, a first plurality of content recommendations, wherein the first prompt includes a first search query and first historic information associated with an entity, and the first plurality of content recommendations is presented via a user interface of a device; receiving a selection of a content recommendation of the first plurality of content recommendations; generating, using the generative machine learning model and a second prompt, a second plurality of content recommendations, wherein the second prompt includes a second search query and second historic information associated with the entity; generating a ranked order of the second plurality of content recommendations using a history of entity interactions including the selection of the content recommendation of the first plurality of content recommendations; determining a plurality of context-aware recommendations by optimizing a permutation of the ranked order of the second plurality of content recommendations; and causing the plurality of context-aware recommendations to be presented via the user interface of the device.

In some aspects, the techniques described herein relate to a non-transitory machine-readable storage medium, wherein the plurality of context-aware recommendations includes the second plurality of content recommendations arranged in an order based on one or more attributes of the second plurality of content recommendations.

In some aspects, the techniques described herein relate to a non-transitory machine-readable storage medium, wherein the history of entity interactions includes one or more entity interactions associated with the entity during a time period.

In some aspects, the techniques described herein relate to a non-transitory machine-readable storage medium, wherein the history of entity interactions includes one or more content recommendations generated by the generative machine learning model.

In some aspects, the techniques described herein relate to a non-transitory machine-readable storage medium, wherein generating the ranked order of the second plurality of content recommendations further includes instructions that, when executed by at least one processor, cause the at least one processor to perform at least one operation including: executing a machine learning model to generate a context, wherein the context is used to adjust a probability score of one or more content recommendations of the second plurality of content recommendations.

In some aspects, the techniques described herein relate to a non-transitory machine-readable storage medium, wherein the machine learning model is trained using a real-time loss that is based on the history of entity interactions and the second plurality of content recommendations.

Clause 1. A method comprising: generating, using a generative machine learning model and a first prompt, a first plurality of content recommendations, wherein the first prompt comprises a first search query and first historic information associated with an entity, and the first plurality of content recommendations is presented via a user interface of a device; receiving a selection of a content recommendation of the first plurality of content recommendations; generating, using the generative machine learning model and a second prompt, a second plurality of content recommendations, wherein the second prompt comprises a second search query and second historic information associated with the entity; generating a ranked order of the second plurality of content recommendations using a history of entity interactions including the selection of the content recommendation of the first plurality of content recommendations; determining a plurality of context-aware recommendations by optimizing a permutation of the ranked order of the second plurality of content recommendations; and causing the plurality of context-aware recommendations to be presented via the user interface of the device.

Clause 2. The method of clause 1, wherein the plurality of context-aware recommendations includes the second plurality of content recommendations arranged in an order based on one or more attributes of the second plurality of content recommendations.

Clause 3. The method of clause 1 or claim 2, wherein the history of entity interactions includes one or more entity interactions associated with the entity during a time period.

Clause 4. The method of any clauses 1-3, wherein the history of entity interactions includes one or more content recommendations generated by the generative machine learning model.

Clause 5. The method of any clauses 1-4, wherein generating the ranked order of the second plurality of content recommendations further comprises: executing a machine learning model to generate a context, wherein the context is used to adjust a probability score of one or more content recommendations of the second plurality of content recommendations.

Clause 6. The method of clause of any clauses 1-5, wherein the machine learning model is trained using a real-time loss that is based on the history of entity interactions and the second plurality of content recommendations.

Clause 7. The method of clause of any clauses 1-6, wherein determining the plurality of context-aware recommendations further comprises: generating a number of ranked lists using the second plurality of content recommendations; and selecting a ranked list from the number of ranked lists that maximizes a reward function representing a maximum likelihood of the entity interacting with a content recommendation at a position of the ranked list given the context.

Clause 8. A system comprising: at least one processor; and at least one memory device coupled to the at least one processor, wherein the at least one memory device comprises instructions that, when executed by the at least one processor, cause the at least one processor to perform at least one operation comprising: generating, using a generative machine learning model and a first prompt, a first plurality of content recommendations, wherein the first prompt comprises a first search query and first historic information associated with an entity, and the first plurality of content recommendations is presented via a user interface of a device; receiving a selection of a content recommendation of the first plurality of content recommendations; generating, using the generative machine learning model and a second prompt, a second plurality of content recommendations, wherein the second prompt comprises a second search query and second historic information associated with the entity; generating a ranked order of the second plurality of content recommendations using a history of entity interactions including the selection of the content recommendation of the first plurality of content recommendations; determining a plurality of context-aware recommendations by optimizing a permutation of the ranked order of the second plurality of content recommendations; and causing the plurality of context-aware recommendations to be presented via the user interface of the device.

Clause 9. The system of clause 8, wherein the plurality of context-aware recommendations includes the second plurality of content recommendations arranged in an order based on one or more attributes of the second plurality of content recommendations.

Clause 10. The system of clause 8 or clause 9, wherein the history of entity interactions includes one or more entity interactions associated with the entity during a time period.

Clause 11. The system of any clauses 8-10, wherein the history of entity interactions includes one or more content recommendations generated by the generative machine learning model.

Clause 12. The system of any clauses 8-11, wherein generating the ranked order of the second plurality of content recommendations further comprises instructions that, when executed by the at least one processor, cause the at least one processor to perform at least one operation comprising: executing a machine learning model to generate a context, wherein the context is used to adjust a ranking score of one or more content recommendations of the second plurality of content recommendations.

Clause 13. The system of any clauses 8-12, wherein the machine learning model is trained using a real-time loss that is based on the history of entity interactions and the second plurality of content recommendations.

Clause 14. The system of any clauses 8-13, wherein determining the plurality of context-aware recommendations further comprises instructions that, when executed by the at least one processor, cause the at least one processor to perform at least one operation comprising: generating a number of ranked lists using the second plurality of content recommendations; and selecting a ranked list from the number of ranked lists that maximizes a reward function representing a maximum likelihood of the entity interacting with a content recommendation at a position of the ranked list given the context.

Clause 15. A non-transitory machine-readable storage medium comprising instructions that, when executed by at least one processor, cause the at least one processor to perform at least one operation comprising: generating, using a generative machine learning model and a first prompt, a first plurality of content recommendations, wherein the first prompt comprises a first search query and first historic information associated with an entity, and the first plurality of content recommendations is presented via a user interface of a device; receiving a selection of a content recommendation of the first plurality of content recommendations; generating, using the generative machine learning model and a second prompt, a second plurality of content recommendations, wherein the second prompt comprises a second search query and second historic information associated with the entity; generating a ranked order of the second plurality of content recommendations using a history of entity interactions including the selection of the content recommendation of the first plurality of content recommendations; determining a plurality of context-aware recommendations by optimizing a permutation of the ranked order of the second plurality of content recommendations; and causing the plurality of context-aware recommendations to be presented via the user interface of the device.

Clause 16. The non-transitory machine-readable storage medium of clause 15, wherein the plurality of context-aware recommendations includes the second plurality of content recommendations arranged in an order based on one or more attributes of the second plurality of content recommendations.

Clause 17. The non-transitory machine-readable storage medium of clause 15 or claim 16, wherein the history of entity interactions includes one or more entity interactions associated with the entity during a time period.

Clause 18. The non-transitory machine-readable storage medium of any clauses 15-17, wherein the history of entity interactions includes one or more content recommendations generated by the generative machine learning model.

Clause 19. The non-transitory machine-readable storage medium of any clauses 15-18, wherein generating the ranked order of the second plurality of content recommendations further comprises instructions that, when executed by at least one processor, cause the at least one processor to perform at least one operation comprising: executing a machine learning model to generate a context, wherein the context is used to adjust a probability score of one or more content recommendations of the second plurality of content recommendations.

Clause 20. The non-transitory machine-readable storage medium of any clauses 15-19, wherein the machine learning model is trained using a real-time loss that is based on the history of entity interactions and the second plurality of content recommendations.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method comprising:

generating, using a generative machine learning model and a first prompt, a first plurality of content recommendations, wherein the first prompt comprises a first search query and first historic information associated with an entity, and the first plurality of content recommendations is presented via a user interface of a device;

receiving a selection of a content recommendation of the first plurality of content recommendations;

generating, using the generative machine learning model and a second prompt, a second plurality of content recommendations, wherein the second prompt comprises a second search query and second historic information associated with the entity;

generating, using a feed-forward network of an alignment system, a ranked order of the second plurality of content recommendations using a history of entity interactions including the selection of the content recommendation of the first plurality of content recommendations;

determining, by applying a ranker component of the alignment system to the ranked order output by the feed-forward network, a plurality of context-aware recommendations by determining a position of content recommendations of the ranked order with respect to the second plurality of content recommendations and entity engagement at the position; and causing the plurality of context-aware recommendations to be presented via the user interface of the device.

2. The method of claim 1, wherein the plurality of context-aware recommendations includes the second plurality of content recommendations arranged in an order based on one or more attributes of the second plurality of content recommendations.

3. The method of claim 1, wherein the history of entity interactions includes one or more entity interactions associated with the entity during a time period.

4. The method of claim 1, wherein the history of entity interactions includes one or more content recommendations generated by the generative machine learning model.

5. The method of claim 1, wherein generating the ranked order of the second plurality of content recommendations further comprises:

executing a machine learning model to generate a context, wherein the context is used to adjust a probability score of one or more content recommendations of the second plurality of content recommendations.

6. The method of claim 5, wherein the machine learning model is trained using a real-time loss that is based on the history of entity interactions and the second plurality of content recommendations.

7. The method of claim 5, wherein determining the plurality of context-aware recommendations further comprises:

generating a number of ranked lists using the second plurality of content recommendations; and selecting a ranked list from the number of ranked lists that maximizes a reward function representing a maximum likelihood of the entity interacting with a content recommendation at a position of the ranked list given the context.

8. A system comprising:

at least one processor; and at least one memory device coupled to the at least one processor, wherein the at least one memory device comprises instructions that, when executed by the at least one processor, cause the at least one processor to perform at least one operation comprising:

generating, using a generative machine learning model and a first prompt, a first plurality of content recommendations, wherein the first prompt comprises a first search query and first historic information associated with an entity, and the first plurality of content recommendations is presented via a user interface of a device;

receiving a selection of a content recommendation of the first plurality of content recommendations;

generating, using the generative machine learning model and a second prompt, a second plurality of content recommendations, wherein the second prompt comprises a second search query and second historic information associated with the entity;

generating, using a feed-forward network of an alignment system, a ranked order of the second plurality of content recommendations using a history of entity interactions including the selection of the content recommendation of the first plurality of content recommendations;

determining, by applying a ranker component of the alignment system to the ranked order output by the feed-forward network, a plurality of context-aware recommendations by determining a position of content recommendations of the ranked order with respect to the second plurality of content recommendations and entity engagement at the position;

and causing the plurality of context-aware recommendations to be presented via the user interface of the device.

9. The system of claim 8, wherein the plurality of context-aware recommendations includes the second plurality of content recommendations arranged in an order based on one or more attributes of the second plurality of content recommendations.

10. The system of claim 8, wherein the history of entity interactions includes one or more entity interactions associated with the entity during a time period.

11. The system of claim 8, wherein the history of entity interactions includes one or more content recommendations generated by the generative machine learning model.

12. The system of claim 8, wherein generating the ranked order of the second plurality of content recommendations further comprises instructions that, when executed by the at least one processor, cause the at least one processor to perform at least one operation comprising:

executing a machine learning model to generate a context, wherein the context is used to adjust a ranking score of one or more content recommendations of the second plurality of content recommendations.

13. The system of claim 12, wherein the machine learning model is trained using a real-time loss that is based on the history of entity interactions and the second plurality of content recommendations.

14. The system of claim 12, wherein determining the plurality of context-aware recommendations further comprises instructions that, when executed by the at least one processor, cause the at least one processor to perform at least one operation comprising:

generating a number of ranked lists using the second plurality of content recommendations; and selecting a ranked list from the number of ranked lists that maximizes a reward function representing a maximum likelihood of the entity interacting with a content recommendation at a position of the ranked list given the context.

15. A non-transitory machine-readable storage medium comprising instructions that, when executed by at least one processor, cause the at least one processor to perform at least one operation comprising:

generating, using a generative machine learning model and a first prompt, a first plurality of content recommendations, wherein the first prompt comprises a first search query and first historic information associated with an entity, and the first plurality of content recommendations is presented via a user interface of a device;

receiving a selection of a content recommendation of the first plurality of content recommendations;

generating, using the generative machine learning model and a second prompt, a second plurality of content recommendations, wherein the second prompt comprises a second search query and second historic information associated with the entity;

generating, using a feed-forward network of an alignment system, a ranked order of the second plurality of content recommendations using a history of entity interactions including the selection of the content recommendation of the first plurality of content recommendations;

determining, by applying a ranker component of the alignment system to the ranked order output by the feed-forward network, a plurality of context-aware recommendations by determining a position of content recommendations of the ranked order with respect to the second plurality of content recommendations and entity engagement at the position; and causing the plurality of context-aware recommendations to be presented via the user interface of the device.

16. The non-transitory machine-readable storage medium of claim 15, wherein the plurality of context-aware recommendations includes the second plurality of content recommendations arranged in an order based on one or more attributes of the second plurality of content recommendations.

17. The non-transitory machine-readable storage medium of claim 15, wherein the history of entity interactions includes one or more entity interactions associated with the entity during a time period.

18. The non-transitory machine-readable storage medium of claim 15, wherein the history of entity interactions includes one or more content recommendations generated by the generative machine learning model.

19. The non-transitory machine-readable storage medium of claim 15, wherein generating the ranked order of the second plurality of content recommendations further comprises instructions that, when executed by at least one processor, cause the at least one processor to perform at least one operation comprising:

executing a machine learning model to generate a context, wherein the context is used to adjust a probability score of one or more content recommendations of the second plurality of content recommendations.

20. The non-transitory machine-readable storage medium of claim 19, wherein the machine learning model is trained using a real-time loss that is based on the history of entity interactions and the second plurality of content recommendations.

* * * * *